US008311912B2

(12) United States Patent
Prieston

(10) Patent No.: US 8,311,912 B2
(45) Date of Patent: Nov. 13, 2012

(54) METHOD FOR DETERMINING PREMIUMS FOR REPRESENTATION AND WARRANTY INSURANCE FOR MORTGAGE LOANS

(76) Inventor: Arthur J Prieston, San Rafael, CA (US)

( * ) Notice: Subject to any disclaimer, the term of this patent is extended or adjusted under 35 U.S.C. 154(b) by 2107 days.

(21) Appl. No.: 11/072,407

(22) Filed: Mar. 7, 2005

(65) Prior Publication Data

US 2005/0203831 A1 Sep. 15, 2005

Related U.S. Application Data

(60) Provisional application No. 60/600,832, filed on Aug. 12, 2004, provisional application No. 60/552,712, filed on Mar. 15, 2004.

(51) Int. Cl.
*G06Q 40/00* (2006.01)
(52) U.S. Cl. .............................................. 705/35; 705/4
(58) Field of Classification Search ........... 705/4, 35–40
See application file for complete search history.

(56) References Cited

U.S. PATENT DOCUMENTS

| | | | |
|---|---|---|---|
| 4,876,648 A | 10/1989 | Llyod | |
| 6,029,149 A | 2/2000 | Dykstra et al. | |
| 6,119,103 A | 9/2000 | Basch et al. | |
| 6,186,793 B1 | 2/2001 | Brubaker | |
| 6,233,566 B1 | 5/2001 | Levine et al. | |
| 6,898,574 B1 | 5/2005 | Regan | |
| 7,146,337 B1 | 12/2006 | Ward et al. | |
| 7,340,434 B2 | 3/2008 | Schnall | |
| 7,499,882 B2 | 3/2009 | Cole | |
| 7,599,882 B2 | 10/2009 | Cagan | |
| 7,707,103 B2 | 4/2010 | Prieston | |
| 7,725,386 B2 | 5/2010 | Prieston | |
| 2001/0029482 A1 | 10/2001 | Tealdi et al. | |
| 2002/0103750 A1 | 8/2002 | Herzfeld | |
| 2002/0133371 A1 | 9/2002 | Cole | |
| 2003/0050884 A1 | 3/2003 | Barnett | |
| 2003/0093365 A1 | 5/2003 | Halper et al. | |
| 2003/0093366 A1 | 5/2003 | Halper et al. | |
| 2003/0115125 A1 | 6/2003 | Lee et al. | |
| 2003/0120588 A1 | 6/2003 | Dodd et al. | |
| 2004/0019508 A1 | 1/2004 | Yaruss et al. | |
| 2004/0019544 A1 | 1/2004 | Yaruss et al. | |
| 2004/0030616 A1 | 2/2004 | Florance et al. | |

(Continued)

OTHER PUBLICATIONS

DeZube, Dona, "Fraudgate", Mortgage Banking, Nov. 2000, vol. 61, No. 2, pp. 18-25.

(Continued)

*Primary Examiner* — Thu Thao Havan
(74) *Attorney, Agent, or Firm* — Cahn & Samuels, LLP

(57) ABSTRACT

An insurance program for entities in the mortgage industry that provides coverage for financial loss as a result of material inaccuracies in the financial information provided by or on behalf of the borrower. The insurance program preferably includes the initial insurance application and establishment of an insurance agreement, periodic issuing of individual insurance coverages for particular loans handled by the lender, training and consulting on improved controls for lenders, maintaining an ineligible database of entities and a database of loan information, and handling of claims. The periodic issuing of individual insurance coverages includes receiving production information from the lender and determining the premium for the production information based at least in part on the insurance agreement. In at least one embodiment, the periodic issuing of individual insurance coverages includes scrubbing production information against databases as part of determining which loans on which to calculate the premium. The insurance program also includes a methodology for lender processing of new mortgage applications.

25 Claims, 14 Drawing Sheets

U.S. PATENT DOCUMENTS

| | | | |
|---|---|---|---|
| 2004/0054621 A1* | 3/2004 | Bretvin | 705/38 |
| 2004/0098329 A1 | 5/2004 | Tilton | |
| 2004/0215553 A1 | 10/2004 | Gang et al. | |
| 2005/0010517 A1 | 1/2005 | Lowenstein et al. | |
| 2005/0108025 A1 | 5/2005 | Cagan | |
| 2005/0203779 A1 | 9/2005 | Prieston | |
| 2005/0203830 A1 | 9/2005 | Prieston | |
| 2005/0203832 A1 | 9/2005 | Prieston | |
| 2005/0203834 A1 | 9/2005 | Prieston | |
| 2006/0136330 A1 | 6/2006 | DeRoy et al. | |
| 2006/0178918 A1 | 8/2006 | Mikurak | |

OTHER PUBLICATIONS

ForRelease.com, "PBIS Insurance Services Enters Agreement with Greenpoint Mortgage to Provide Fraud Insurance to Correspondents," printed on Nov. 8, 2004.

Prieston, Arthur J., "Mortgage Fraud and Its Impact on Mortgage Lenders," Oct. 7, 2004.

Safeco Financial Institution Solutions, "Mortgage Representations and Warranties Coverage," SM 61 44/EF, May 2002.

Sysdome, redacted Affinity Electronic Review Alert Report, Dec. 29, 2004.

Sysdome, Inc., "The Sysdome Advantage," 2004.

Sysdome, Inc., "Sysdome Broker Score," ,www.sysdome.com/content/brokers/index.asp, printed on Oct. 20, 2004.

Sysdome, Inc., "TPO Certification Program at a Glance," Loan Quality and Fraud Prevention Services, www.sysdonne.com/content/brokers/tpocert.asp, printed on Oct. 20, 2004.

Scientific and Technical Information Center (STIC), Search Report EIC 3600 for U.S. Appl. No. 11/079,927, STIC Database Tracking No. 312479, Nov. 6, 2009.

* cited by examiner

METHOD FOR DETERMINING PREMIUMS FOR REPRESENTATION AND WARRANTY INSURANCE FOR MORTGAGE LOANS

This patent application claims the benefit of U.S. Provisional Patent Application No. 60/600,832, filed Aug. 12, 2004, and U.S. Provisional Patent Application No. 60/552,712, filed Mar. 15, 2004. Both of these provisional patent applications are hereby incorporated by reference.

I. FIELD OF THE INVENTION

This invention relates to the insurance industry and more particularly to insuring against losses as a result of material inaccuracies in the financial information provided by or on behalf of the borrower. This type of insurance is known as lender's representation and warranty insurance.

II. BACKGROUND OF THE INVENTION

Industry studies estimate that between 10 and 15 percent of all mortgage applications included some fraud or misrepresentations which translate into billions of dollars per year in costs to investors (entities that purchase loans for investment purposes), lenders (entities that participate in the loan process and/or sell acquired loans to investors), and borrowers. The level of misrepresentation and fraud includes anything from the borrower's income or real source from which the buyer's down payment came from to fake documentation for credit scores, tax returns, identities, as well as inflated appraisals. Over the last few years, the mortgage industry as a result is suffering from an increase in risk of financial loss including: repurchase requests being made by investors against lenders, a warehouse lender requiring a loan to be removed from the warehouse line even though the loan may not be saleable, and diminution in value of a loan being held by a lender in a portfolio. Repurchase requests, inability to sell the mortgage, or diminution in value of a portfolio loan can be based on a variety of reasons including credit (or lack thereof) and misrepresentation. Both of these reasons can occur even though a lender follows and uses all of the controls it has in place, because these controls may still be subverted by individuals looking to commit fraud.

Many times when a loan is fraudulently obtained by an individual, acting alone or in a conspiracy with other entities, the individual will disappear shortly after the loan closes and before any payments are due on the mortgage. Although, a few payments may be made to gain some additional time to commit further fraud and/or more completely disappear.

Another source of fraud is where an unwitting buyer is persuaded to purchase a significantly overvalued property based on a fraudulent appraisal. The seller then pockets the profit presumably after payments to the appraiser and/or others who participated in the scheme. The new owner most times finds it impossible to refinance or sell the property to pay off the loan, because the property is worth less than the loan value.

These problems in part result from the lack of industry standards for preventing fraud and for measuring options for combating fraud. As a result, the mortgage industry is suffering from lenders receiving repurchase requests from investors, lenders being unable to sell loans to investors, and/or lenders experiencing diminution in value of a portfolio loan. As the costs increase for lenders, the costs are then passed on to future mortgage applicants and borrowers.

Given the above problems in the mortgage industry, a need exists for additional tools to protect lenders against financial losses based on a misrepresentation.

III. SUMMARY OF THE INVENTION

At least one embodiment of the invention includes a method for offering insurance to lenders for loans handled by them, the method including receiving a request for insurance from a lender, requesting information from the lender as part of an insurance application, sending received information on the lender for obtaining a risk classification based at least on a likelihood of a misrepresentation occurring during the loan application process, learning the risk classification assigned for the lender, analyzing received information together with the risk classification, and when a positive analysis results, setting a premium rate to charge the lender based at least on the analysis and the risk classification, and offering an insurance agreement that includes the terms to be agreed to by the lender and conditions, the conditions include a guarantee from the lender to use existing controls or improved controls, and the premium rate to be charged for loans that are covered by the insurance agreement.

At least one embodiment of the invention includes a method for offering insurance to lenders for loans handled by them, the method including receiving a request for insurance from a lender, requesting information from the lender as part of an insurance application, determining a risk classification based at least on received information on the lender and a likelihood of a misrepresentation occurring during the loan application process, analyzing received information together with the risk classification, and when a positive analysis results, setting a premium rate to charge the lender based at least on the analysis and the risk classification, and offering an insurance agreement that includes the terms to be agreed to by the lender and conditions, the conditions include a guarantee from the lender to use existing controls or improved controls, and the premium rate to be charged for loans that are covered by the insurance agreement.

At least one embodiment of the invention includes a method for offering insurance to lenders for loans handled by them, the method including receiving a request for insurance from a lender, requesting information from the lender as part of an insurance application, sending received information on the lender for obtaining a rating, learning the rating assigned for the lender, analyzing received information together with the rating, and when a positive analysis results, setting a premium rate to charge the lender based at least on the analysis and the rating, and offering an insurance agreement that includes the terms to be agreed to by the lender and conditions, the conditions include a guarantee from the lender to use existing controls or improved controls, and the premium rate to be charged for loans that are covered by the insurance agreement.

At least one embodiment of the invention includes a method for offering insurance to lenders for loans handled by them, the method including receiving a request for insurance from a lender, requesting information from the lender as part of an insurance application, determining a rating based at least on information on the lender and a likelihood of a misrepresentation occurring during the loan application process, analyzing received information together with the rating, and when a positive analysis results, setting a premium rate to charge the lender based at least on the analysis and the rating, and offering an insurance agreement that includes the terms to be agreed to by the lender and conditions, the conditions include a guarantee from the lender to use existing controls or improved controls, and the premium rate to be charged for loans that are covered by the insurance agreement.

At least one embodiment of the invention includes a method for providing a representation and warranty insurance to aggregating entities for a mortgage pool, the method including receiving an insurance application from the aggregating entity for the mortgage pool, conducting a risk assessment of the mortgage pool based at least on information contained in the insurance application, determining a premium to charge for the mortgage pool based at least on the risk assessment, and issuing an insurance agreement including the premium for insurance coverage of the mortgage pool to the aggregating entity.

At least one embodiment of the invention includes a method for determining an insurance premium for a group of loans for a particular time period handled by a lender or investor covered by a representation and warranty insurance policy, the method including receiving production information for the group of loans for the particular time period from the lender, analyzing production information for a profile, setting a premium for each covered loan in the group of loans based on pricing from the insurance policy, notifying the lender of the premiums for the group of loans, and collecting the premiums from the lender.

At least one embodiment of the invention includes a method for determining an insurance premium for a group of loans for a particular time period handled by a lender covered by a representation and warranty insurance policy, the method including receiving production information for the group of loans for the particular time period from the lender, receiving a designation of which loans within the group of loans the lender wants covered under the insurance policy, analyzing production information for a profile, setting a premium for each covered loan in the group of loans based on pricing from the insurance policy, notifying the lender of the premiums for the group of loans, and collecting the premiums from the lender.

At least one embodiment of the invention includes a method for determining an insurance premium for a group of loans for a particular time period handled by a lender covered by a representation and warranty insurance policy, the method including making available to lenders at least one database containing at least one exclusionary list and loan data, receiving production information for the group of loans for the particular time period from the lender, receiving identification of which loan segments of the group of loans for which the lender is requesting coverage under the insurance policy, scrubbing the received production information against at least one database for matches, when a match occurs for a particular loan, performing the following: notifying the lender that a match occurred for the particular loan, and excluding from coverage at least the reason for the match, setting a premium for each covered loan in the group of loans based on pricing from the insurance policy, notifying the lender of the premiums for the group of loans, and collecting the premiums from the lender.

At least one embodiment of the invention includes a method for a lender to utilize an insurance program providing representation and warranty insurance from an insurer, the method including receiving a mortgage application, reviewing and underwriting the mortgage application, obtaining an appraisal of the property to be subject to the mortgage, scrubbing information from the mortgage application against the contents of at least one database provided by the insurer, at least one database includes an ineligible list, and approving or denying the mortgage application, when the mortgage application is approved, performing the following: transmitting closing instructions to a settlement agent, submitting production information including the closed mortgage to the insurer for insurance coverage, and selling the mortgage to an investor.

At least one embodiment of the invention includes a method for processing a coverage request to an insurance entity made by an insured under a representation and warranty insurance policy, the method including receiving the coverage request resulting from a discovery of a financial misrepresentation of information in a loan file putting the insured at a financial risk of a loss, beginning a mitigation process for the coverage request, reviewing the coverage request to determine if controls as required in the insurance policy were utilized by the insured in processing the loan, determining whether the insurance policy covers the coverage request, and when coverage exists for the coverage request based on the review, performing the following: continuing the mitigation process of the coverage request, and paying a proof of loss relating to the coverage request up to coverage limits of the insurance policy if presented.

At least one embodiment of the invention includes a method for processing a coverage request to an insurance entity made by an insured under a representation and warranty insurance policy, the method including receiving the coverage request resulting from a discovery of a financial misrepresentation of information in a loan file putting the insured at a financial risk of a loss; beginning a mitigation process for the coverage request, the mitigation process includes investigating whether an entity that originated the loan is capable of assisting in refinancing the loan, investigating whether any entity that participated in originating, obtaining or closing the loan is culpable and capable of covering any financial loss associated with the coverage request, investigating whether any entity that participated in closing the loan failed to follow instructions, investigating foreclosure of the property subject to the loan, and investigating whether the financial loss can be minimized by selling the loan to another entity at a discount below the loan value; reviewing the coverage request to determine if controls as required in the insurance policy were utilized by the insured in processing the loan; determining whether the insurance policy covers the coverage request including when the insured participated in the misrepresentation, finding no coverage, when a source of the misrepresentation is excluded from coverage, finding no coverage, and when controls of insured were not utilized properly by the insured, finding no coverage; when coverage exists for the coverage request based on the review, performing the following: continuing the mitigation process of the coverage request, and paying a proof of loss relating to the coverage request up to coverage limits of the insurance policy if presented, and when the proof of loss is presented, begin subrogation using the mitigation process; when the coverage request is denied, allowing the insured to continue mitigation at the insured's expense; and when an entity is culpable, adding the entity to an ineligible list.

At least one embodiment of the invention includes a method for providing a representation and warranty insurance program to lenders in a mortgage field, the method including receiving insurance applications for representation and warranty insurance from lenders; determining which lenders are insurable based on a risk assessment; issuing at least one insurance agreement to an insurable lender including pricing and conditions, conditions include the use of controls and the mortgage (or loan) profile for the particular lender, providing access to insured lenders to a database containing entities which are ineligible to participate in the mortgage process to be able to obtain insurance coverage for a particular mortgage, requiring insured lenders to use the database during the mortgage application process as one condition of the insurance agreement, training personnel of insured lenders on at least one of the following use of controls, signs of fraud, use of the ineligible database, and trends in the mortgage industry; providing access to a database containing information regarding lenders participating in the insurance program to insured lenders and allowing insured lenders to search the database including performing comparisons to other lenders; receiving mortgage production information from insured lenders on a periodic basis; scrubbing the mortgage production information against at least one database to eliminate from coverage any mortgages that cause a match with an entry in the database; calculating a premium based on pricing in the insurance agreement for covering the remaining mortgages that are included in the mortgage production information; handling any request for insurance coverage based on a misrepresentation in the financial information provided by or on behalf of the borrower; mitigating any financial loss that may result from the insurance coverage request using at least legal counsel; and determining whether coverage exists, when coverage exists paying any proof of loss while attempting to recover from participants who perpetrated the misrepresentation, when no coverage exists offering the requesting lender access to the legal counsel for continued mitigation of any financial loss at the lender's expense.

At least one embodiment of the invention includes a method for a lender to utilize an insurance program providing representation and warranty insurance from an insurer, the method including receiving a mortgage application, reviewing and underwriting the mortgage application, obtaining an appraisal of the property to be subject to a lien of the mortgage, scrubbing information from the mortgage application against the contents of at least one database provided by the insurer, at least one database includes an ineligible list, and approving or denying the mortgage application, when the mortgage application is approved, performing the following: transmitting closing instructions to a settlement agent, submitting production information including the closed mortgage to the insurer for insurance coverage, and selling the mortgage to an investor.

At least one embodiment of the invention includes an insurance program system for providing an insurance program including insurance and recovery services from at least one business unit to a plurality of insureds, including an operational entity having a first contractual relationship with at least one of the insureds, the first contractual relationship having terms whereby the operational entity provides insurance services and recovery services from plural sources in response to receipt of value from the insured based on information provided by the insured, the operational entity further having at least one business unit relationship with at least one of the business units, the business unit relationship having terms whereby the business unit provides recovery services to the operational entity for subsequent delivery to the insured, and the operational entity further having at least one business unit relationship with at least one of the business units, the second business unit relationship having terms whereby the business unit provides due diligence services including providing a risk assessment of the lender to the operational entity for use in setting the premium rate to be paid by the insured to the operational entity.

At least one embodiment of the invention includes an insurance program system for providing representation and warranty insurance to lenders, including a due diligence entity having at least one designated due diligence agent; an insurer entity having at least one designated operational agent; a recovery entity having at least one designated recovery agent; the due diligence agent and the operational agent cooperating according to a predefined contractual relationship in which the operational agent undertakes to locate lenders interested in applying for insurance and obtaining from the lenders application information for delivery to the due diligence agent; the operational agent and the recovery agent cooperating according to a predefined contractual relationship in which the operational agent receives claims based on a repurchase request from an insured lender for delivery to the recovery agent.

At least one embodiment of the invention includes repurchase request recovery system for access by an operational entity having a plurality of insureds and at least one insurance carrier, including a recovery entity having a predefined contractual interface that specifies the terms by which the operational entity may access the recovery entity; the recovery entity functioning according to the predefined contractual interface to receive information from the operational entity regarding a claim filed by one of the plurality of insureds via the interface and to investigate and formulate a recovery strategy for recovering assets using the information, the recovery entity further functioning according to the predefined contractual interface to perform mitigation of the claim for the insured and the insurance carrier, and when the payment is made on the claim, providing subrogation services to the insurance carrier and the operational entity.

At least one embodiment of the invention includes an insurance program system for access by a plurality of lenders, including an operational entity having at least one designated operational agent; the operational entity having a first predefined contractual interface that specifies the terms by which the lenders may access the operational entity; the operational entity functioning according to the first predefined contractual interface to receive premiums via the first predefined contractual interface and to provide representation and warranty insurance to the lenders; the operational entity having a second predefined contractual interface with an insurance carrier, the second predefined contractual interface specifies the terms by which the operational entity and the insurance carrier interact; the operational entity functioning according to the second predefined contractual interface to send value via the second predefined contractual interface and to receive access to financial reserves for representation and warranty insurance coverage delivered to the lenders; the operational entity having a first predefined business relationship interface with a due diligence entity that specifies the terms by which the operational entity and the due diligence entity interact; the operational entity functioning according to the first predefined business relationship interface to send information regarding at least one lender via the first predefined business relationship interface and to receive a rating of at least one lender from the due diligence entity; the operational entity having a second predefined business relationship interface with a recovery entity that specifies the terms by which the operational entity and the recovery entity interact; the operational entity functioning according to the second predefined business relationship interface to send information regarding at least one claim for coverage under the representation and warranty insurance coverage based on a financial loss as a result of material inaccuracies in the financial information provided by or on behalf of a borrower of a lender and to receive recovery services from the recovery entity for mitigating the claim for the lender or recovering the loss of the insurance carrier based on the claim.

An objective of at least one embodiment of the invention is to provide a way for a lender to combat fraud.

Another objective of at least one embodiment of the invention is to provide a way to pass on secondary market costs relating to financial losses resulting from at least one misrepresentation.

Another objective of at least one embodiment of the invention is to provide to each investor security in the lender's ability to make the investor whole in a repurchase request situation when the repurchase request is covered.

Another objective of at least one embodiment of the invention is to provide an incentive to lenders to increase prefunding screening and likewise encourage investors to provide lenders with indemnification options.

Another objective of at least one embodiment of the invention is to provide the mortgage industry with a tool that can assist in combating fraud during the loan application process.

Another objective of at least one embodiment of the invention is to provide an ineligible database to prevent fraud during the mortgage origination process.

An advantage of at least one embodiment of the invention is that it is a tool that should lead to a decrease in the number of fraud cases as the risk for the defrauders increases compared to the potential reward with active recovery methods utilized against them including in part the tracking and locating of the defrauder's assets.

An advantage of at least one embodiment of the invention is that the insurance can be an alternative or a substitute for a credit enhancement in connection with securitization of mortgage backed securities.

An advantage of at least one embodiment of the invention is that the presence of insurance can reduce the cash reserves requirements of the lender.

Given the following enabling description of the drawings, the invention should become evident to a person of ordinary skill in the art.

IV. BRIEF DESCRIPTION OF THE DRAWINGS

The present invention is described with reference to the accompanying drawings. In the drawings, like reference numbers indicate identical or functionally similar elements.

V. DETAILED DESCRIPTION OF THE DRAWINGS

The invention includes an insurance program for lenders in the mortgage industry that are at risk of financial loss including a repurchase request made by an investor (i.e., a purchaser of the mortgage or loan), inability to sell the loan to an investor and thus remove the loan from the lender's warehouse line, and diminution in value of a loan being held by a lender in a portfolio. A mortgage loan means a loan secured by a first or junior lien on residential real property or by certificates of stock or other evidence of ownership interests in, and proprietary leases from, corporations or partnerships formed for the purpose of cooperative ownership of real estate. The insurance program preferably includes the initial insurance application and establishment of an insurance agreement, periodic issuing of individual coverages for particular loans handled by the lender, training and consulting on improved controls for lenders, maintaining a database(s) of ineligible entities and loan information including providing access to participating lenders and/or information subscribers, and handling of repurchase request claims. The invention also preferably includes business arrangements and structures used to provide the insurance program to lenders in the mortgage industry. The insurance program in the exemplary embodiments is offered by an insurance entity. One of ordinary skill in the art will appreciate based on this disclosure that the insurance program could be offered directly to lenders by an insurance carrier (or insurer) and/or through an insurance agent/broker(s).

The insurance program preferably in exchange for an insurance premium will in the event of a financial loss which is caused by a financial inaccuracy of information provided by the borrower or certain other third parties prior to or at the time of funding and not by in whole or in part a breach of certain guidelines by a lender's participation, the insurer will pay the deficiency between 1) the mortgage balance plus the cost of mitigation/subrogation including foreclosure, resale, and any interest charges that have accumulated and 2) the net proceeds received upon sale after foreclosure of the property or disposition of the loan. In an alternative embodiment, coverage would not exist if the only basis for the repurchase request was a bad appraisal obtained on the property; however, if there was a misstatement regarding something else in addition to the bad appraisal, then coverage would exist. The payment preferably is capped at a coverage limit amount for the particular insurance agreement.

Figure 1:
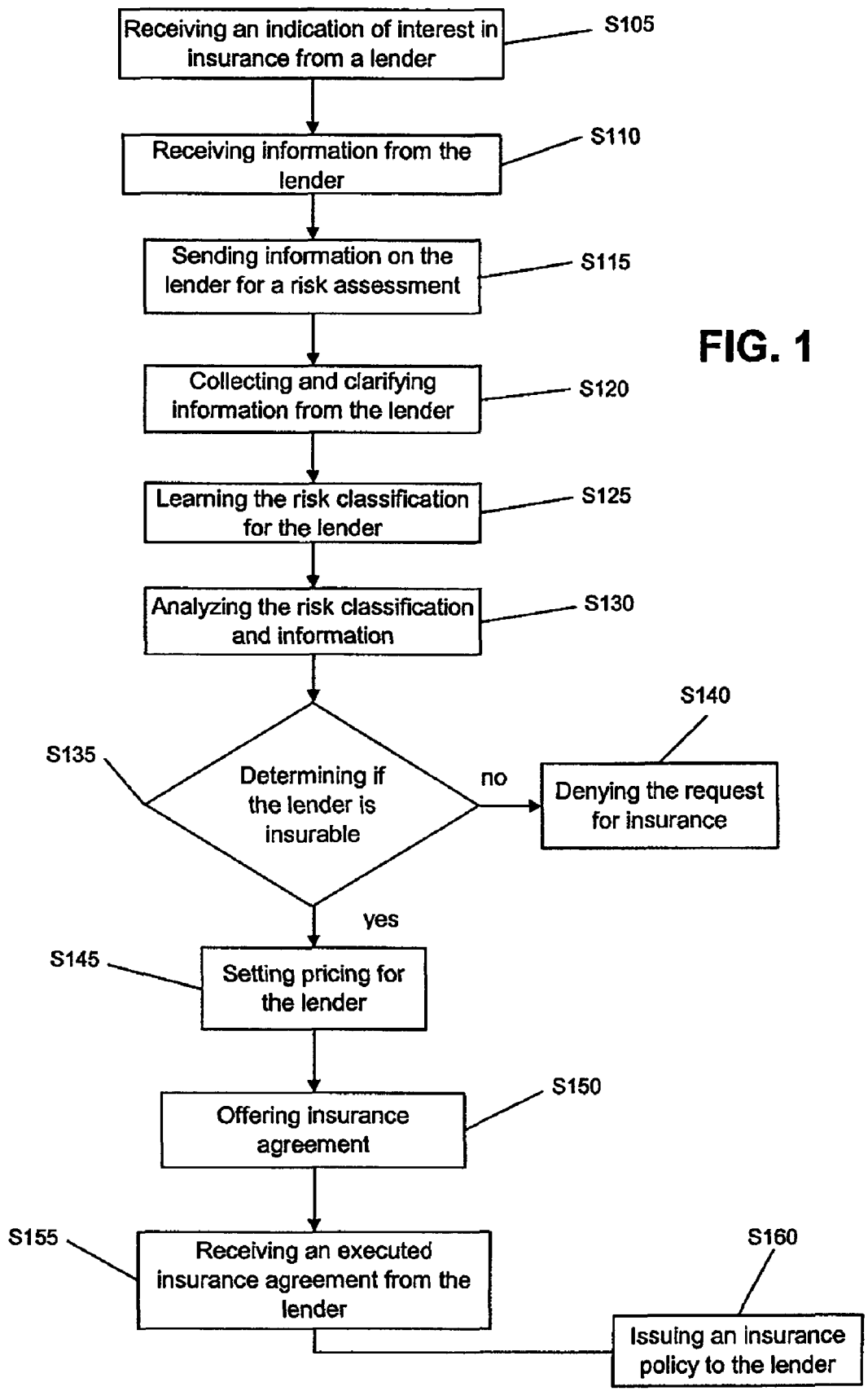
FIGS. 1-6 illustrate flowcharts depicting exemplary embodiments according to the invention.

As is typical in the insurance industry, a type of insurance is made available to a target market, which in this case is the mortgage industry and more particularly entities that handle loans for later resale to other entities. FIG. 1 illustrates an exemplary method of the invention. When a lender is interested in obtaining this type of insurance, the lender may request an insurance application or other information about the insurance program, S105. In response to the inquiry, information is preferably received from the lender as part of an insurance application that is sent to the lender in response to the lender's inquiry, S110. The requested information is directed at obtaining a summary of the lending operations of the applicant (i.e., the lender). Examples of information that can provide the summary include basic yields on loans, volume of loans, channels used to obtain loans (wholesale versus retail), quality of credit scores of borrowers, average loan size, and geographic breakdown of handled loans. Additional examples of information to be requested from the lender include the structure of the lender including quality control and processing components; quality control policies and procedures; the experience levels of management, processing, underwriting, and quality control individuals; historical information regarding repurchase requests and associated losses, early payment default rate and numbers, and foreclosure rates and numbers; use and maintenance of suspension, exclusion, and approved lists of, for example, brokers, correspondents, and appraisers; training provided to employees including type and level; and secondary marketing. The information in at least one embodiment includes copies of documentation for suspension, exclusion, and approved lists, procedures, policies, prior production report(s), loan program information, and broker/correspondent agreement(s). This information assists in setting pricing (for example, basis points) for the premium(s) to charge the lender for loans that receive insurance coverage. Another way to look at it is that the information being requested is directed at determining what loan (or more preferably mortgage) profile for the lender (or lender profile) will be insured, completing a satisfactory due diligence, verifying the lender uses best practices, and determining whether the lender has an environment that controls risk.

In the illustrated embodiment, at least a portion of the information from the lender is sent to an entity that will provide a risk assessment, S115. The risk assessment will lead to a risk classification for the lender. The entity in the illustrated embodiment is independent of the insurance entity but may be an affiliate entity (including a subsidiary) of the insurance entity such as a processing company if not the insurance entity itself. The risk assessment is based on how the lender compares to other lenders in terms of controls, loan products, loan markets, and geographic markets that the lender is present. The risk assessment in at least one exemplary embodiment is based on the quality of the origination process and the internal controls and procedures used by the lender. The risk assessment in at least one exemplary embodiment produces a rating of where along a spectrum the lender is compared to other lenders that assists in determining the level of risk involved with that lender's typical loan compared to other lenders. A possible rating methodology for rating lenders is discussed and disclosed in U.S. Patent Application Ser. No. 60/552,712, which was filed on Mar. 15, 2004 and is hereby incorporated by reference. In an alternative embodiment, while the risk assessment is occurring for the lender, the insurance entity continues to collect information from the lender as part of an insurance application process.

Step S120 includes the collection of any additional information that may be needed to perform the risk analysis and/or be used to determine whether the lender is insurable in step S135. Step S120 will not always occur, because there may be no need to obtain additional information from the lender. Step S125 may occur at the same time, before or after step S120. Step S125 includes the lender receiving (or learning of/determining) the risk assessment results (or risk classification for the lender), and, in at least one exemplary embodiment, the lender also is informed of the results. When step S125, in at least one embodiment, is determining the risk assessment, step S125 includes the analysis discussed above in connection with step S115 and there becomes no need to send the information and step S115 as illustrated in FIG. 1 can be omitted. The risk assessment results in at least one embodiment include a rating of the lender.

Steps S130 through S145 are illustrated as discrete steps of the method, but one of ordinary skill in the art will understand based on this disclosure that these steps can be performed simultaneously and concurrently such that the factors used in the analysis of S130 will dictate the determination of insurability, S135, and will also be used in setting the pricing for the lender, S145. In at least one embodiment, the risk assessment steps S115, S125 are combined with the analysis step S130. The insurance entity preferably analyzes the information collected from the lender in view of the lender risk classification for the lender, S130. Factors of particular interest in the analysis include a lender profile of the lender including loan type, loan size, loan source, and loan geographic information. The experience level of the lender and its personnel in the loan business, and more specifically the experience level(s) with the currently offered products and channels used to obtain loans. For example, if the lender is adding (or recently added) new loan products and/or changing/adding channels to obtain loans, then because of the lower experience level, the lender will be more likely to have processing mistakes and quite possibly be targeted by individuals looking to commit fraud since the lender may be more aggressive and/or less sophisticated in the loan marketplace and thus the risk of a financial loss will be higher. The analysis will lead to determining whether the lender is insurable and at what level, S135, which determination will be based on the analysis.

The determination in at least one embodiment includes determining what loan products and channels of the lender are insurable and to what level of loan size and/or volume. If the determination is that the lender is uninsurable, the request for insurance will be denied or not accepted, S140. However, if the lender is insurable, then the insurance entity will set the pricing (or target premium) such as basis points for the lender based on, for example, the factors used in the analysis above, S145. Other factors that are considered in setting the pricing include projecting what the expected losses would be based on similar lender profiles having the characteristics of the particular lender profile, claims history for the lender, and what training and support may be needed by this lender to improve its controls. Although under one embodiment, second lien loans might have a flat fee premium for them given the risks involved with this particular class of mortgages.

The determination, S135, in another exemplary embodiment includes determining that the lender is insurable if it and its employees receive training, such as the training discussed later in this description, regarding the lending process. This determination may include inquiring with the requesting lender whether it will agree to receive the training. If the lender accepts this requirement, then including training as a condition in the insurance agreement. When an inquiry is not made, the offered insurance agreement can include as a condition that the lender accepting training. Under either option, the insurance entity preferably takes into account the need for training in determining the pricing of the insurance for this particular lender.

After the premium has been determined for the lender, an insurance agreement is offered to the lender, S150. The insurance agreement preferably includes the conditions upon which it is issued. Examples of conditions include information about the calculation of the premium (or premium modifiers or rate or basis points), which preferably is a percentage of the covered loan amount, to be charged for each covered loan and the current lender profile for loans (i.e., the geographic mix, average loan size, product types, and channels). Other exemplary embodiments include a list of approved investors and a requirement to maintain and/or use an ineligible list maintained by the insurer and/or the lender as possible condition(s).

Preferably, as part of the insurance agreement, the lender promises to continue to use existing controls on which the insurance agreement is being issued or alternatively to use in the future improved controls that have been agreed to by the insurer. The improved controls may originate from the insurer as a result of ongoing trend analysis as will be discussed below. Preferably, the lender approaches the insurer in advance of implementation or within a reasonable time period after the lender has made a change in its controls as agreed to by the parties.

At least one exemplary embodiment includes a minimum premium amount to be collected from the lender for each period as a condition. As discussed above, pricing for the lender is based upon anticipate loan production numbers, i.e., the lender profile, in view of the controls and experience of the lender (or the anticipated risk). If the average size of loans decreases while maintaining the overall production volume in terms of total mortgage value, then the risk will be higher than was originally agreed to be covered and as such a minimum premium can be collected to take this into account. Or if the total mortgage value for a production period falls below the lender commitments for production, then the minimum premium will cover the ancillary services that are included as part of the illustrated insurance program. If the total premium for a period of time is lower than the minimum premium amount, then the minimum premium amount would be charged.

If the insurance agreement is acceptable to the lender, receiving an executed insurance agreement from the lender, S155. Upon receipt of the insurance agreement and any required payment, the insurer issues an insurance policy to the lender, S160. One of ordinary skill in the art will appreciate based on this disclosure that these last two steps are contingent upon the lender accepting the insurance agreement, and as such may not occur every time.

Acceptance of a lender into the insurance program in at least one embodiment is certification as to the quality of the lender and the mortgages handled by the lender. In this embodiment, the method illustrated in FIG. 1 further includes issuing a certification to the lender that it is a quality lender that uses appropriate controls for the type and source of the loans handled by the lender (not shown).

Another exemplary embodiment adds a consulting and/or training aspect to assist lenders in improving and/or refining their controls based on trends that are noticed in the mortgage industry and/or information learned from investigating claims for coverage filed by other lenders, S510.

A further exemplary embodiment adds the issuance of an insurance certificate for each loan handled by the lender that is covered by the insurance agreement and for which a premium has been received. This insurance certificate may, for example, be a paper certificate, an electronic certificate, or a field setting in a database. This insurance certificate can then be included in the loan file by the lender to provide assurance to a potential investor without the need for the investor to inquire with the insurer regarding a particular loan.

Another exemplary embodiment of the invention allows a lender to obtain coverage for previous production upon establishment of the insurance agreement. In this embodiment, preferably this is the sole opportunity for a lender to obtain coverage for mortgages closed prior to execution of the insurance agreement and issuance of the insurance policy. The process for obtaining coverage is that the mortgages to be covered would be submitted as part of an initial production information (or coverage report) about the mortgages closed over a prior period similar to what is described below in connection with, for example, FIG. 2A. In a further embodiment, a requirement is that the profile for these mortgages is to be similar to the loan profile covered by the insurance agreement, otherwise the pricing would be most likely different.

Another exemplary embodiment allows the lender to have one or more correspondent as an additional insured on the issued insurance policy for loans purchased by the lender. The lender might request this if it would also like its correspondent(s) to have the benefit of coverage under the insurance policy and be removed from the list of possible candidates from which a contribution may be requested when a request for coverage is made (assuming that the correspondent was not an active participant in the misrepresentation that led to the request for coverage). When the lender would like to include a correspondent(s), then as part of the risk assessment a review is made of information about the correspondent(s) to be able to properly determine the additional risk from including the correspondent(s) as an additional insured. The risk assessment includes a review of information similar to that collected from the lender. In at least one embodiment, the lender would be charged either an one time premium for the additional insured(s) or an increased pricing to take into account the presence of an additional insured.

The insurance coverage of a particular loan is set for a predetermined time that preferably is shorter than the life of the loan. There typically is a wave of financial losses in the first three years of loans with the biggest bulk of the losses occurring in the first year of a loan. The first year losses include 1) repurchase requests based on either quality control conducted by the investor or the loan has become delinquent and an early payment default exists, and 2) unsaleable loans held by the lender on a warehouse line that may result from quality control of the lender. A second spike occurs between two to three years after the loan is closed, because during the foreclosure/REO phase it is learned there was a misrepresentation during the loan application process. Preferably, the insurance policy for a particular loan runs for at least one year, more preferably at least for 18 months, and most preferably for at least three years.

The insurance agreement in another exemplary embodiment includes a list of eligible investors to whom the insured lenders can sell covered loans to and maintain coverage. This provides a list of known sources from whom a repurchase request may come from back to the lender. The list is preferably updated on a regular basis based on, for example, market developments and information from insurance applications.

Figure 2A:
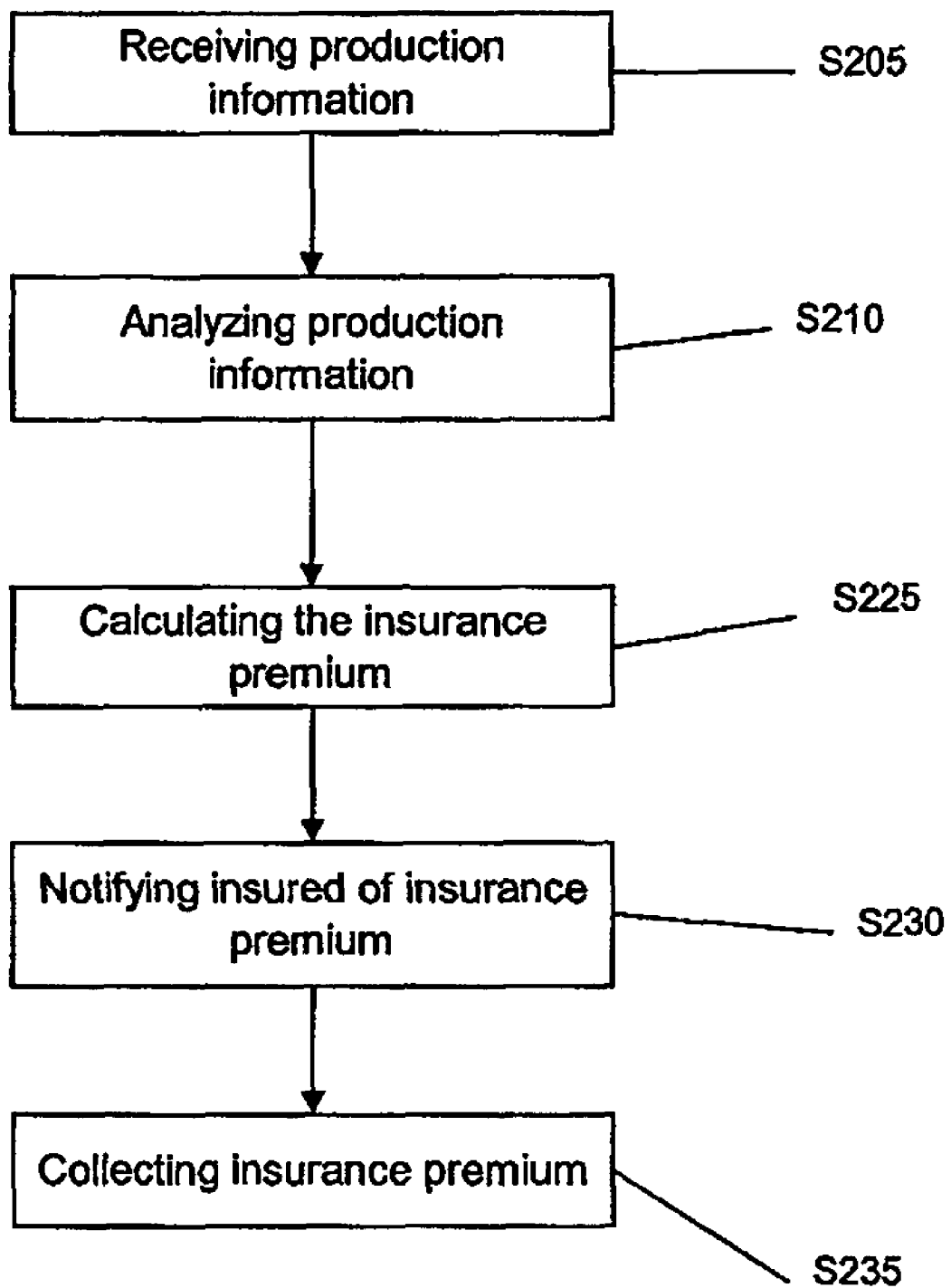

FIG. 2A illustrates an exemplary method for providing insurance coverage for mortgages based on the mortgages themselves. Preferably as part of the insurance policy, the lender submits on a periodic basis, for example, monthly production information (or monthly coverage reports) for loans handled by the lender, S205. Lenders may handle a variety of loans including retail loans (loans originated and closed by the lender) and loans acquired through the wholesale market (either correspondent (originated and closed by another entity) or broker (originated by another entity and closed by the lender)). The production information preferably includes a listing of the loans handled by the lender, the dollar figures for each loan, and identification information such as the address for the residence (or property) being covered by the loan, loan terms, the buyer(s) (or borrower(s)), and the seller(s) of the property. The identification information in at least one embodiment can be used to scrub the individual loans against a database, for example, as a fraud prevention tool. More preferably, the production information includes, but is not limited to, the interest rate and the term of the loan, the loan number, the loan to value number (LTV), the occupancy status, the appraisal value, the FICO credit score, the loan risk grade, the document type (i.e., what level of documentation was required to obtain the mortgage such as no, low, etc.) for the loan, and the loan amount. The production information may also include the identities of participants in obtaining and closing the loan including the originating entity (if different than the lender such as the mortgage broker), the appraiser, the settlement agent, the real estate agent(s), the loan closing entity (if different than the lender), and the abstract company. The originating entity will arise in the situation where there is a chain of lenders involved with handling the application and/or loan, then it will preferably be the first lender that will be included in the production information although the entire chain of lenders could be included.

The production information preferably is analyzed, S210, in part to create a lender profile for that time period, which in this example is a month, for comparing against the lender profile derived from the insurance application submission. If the lender profile changes over time in terms of make-up of the loans handled by the lender, for example, the loan sources, the loan types, the geographic regions, etc., then the divergence is tracked and after a period of time this may lead to a change in the premium charged the lender. A simple example of a lender profile change is where the lender originally had 80% of the loans retail and 20% wholesale and if at a latter date the ratio is 90%/10% (the risk decreases and this impacts the risk positively) or 60%/40% (the risk increases and this impacts the risk negatively). The change in risk of financial loss then may be used to adjust the premium charged to the lender for coverage based on the change in the lender profile from when the lender originally applied for the insurance agreement. As discussed above, one way to adjust the premium is by adjusting the premium modifier that is used to calculate the premium for a particular loan.

Of particular concern during this process are deviations from the lender's profile which would indicate an expansion into more risky business without confirmation of the requisite controls being put in place to mitigate the enhanced risks. For example, a lender may be changing its business model from generating predominately prime retail mortgage loans to generating predominately wholesale subprime loans. A review and assessment of whether the insured may continue to participate in the program or if so, if it can continue utilizing the current parameters for its participation. This risk assessment, for instance, may condition continued participation on implementation of additional controls and/or obtaining a certain level of risk mitigation training for appropriate staff members.

An alternative embodiment would allow the lender to designate (or identify) which loans it wants subject to insurance coverage. However, to avoid the lenders from only insuring the riskiest loans, the designation should be of particular loan segments (or categories) such that all of the wholesale or subprime mortgages would be covered. Part of the reason to allow a designation is to avoid loan categories that have tight margins such as Fannie Mae conforming loans, which make it difficult to factor in a premium into the offered mortgage rates and still be competitive. The lender's designation will preferably impact the premium modifier if the less risky portions of the lender profile are removed, which means that the riskier loans are being covered and by definition have a higher risk of a financial loss occurring and coverage being provoked.

The other purpose for the production information is to calculate the insurance premium by taking each loan individually and multiplying the loan amount against a premium modifier, S225. Additional factors that may be considered include the lender risk assessment and market trends. If the trends in the mortgage market are such that certain types of loans are becoming riskier, then another embodiment adds another multiplier for use in calculating the insurance premium. The lender risk assessment may provide its own multiplier in calculating the insurance premium or incorporated into the premium modifier, the former would allow a more fluid calculation and flexibility in modifying the lender risk assessment as a standalone multiplier separate from multipliers for other aspects. Preferably, the insured is notified of the insurance premium due, S230, and the insurance premium is collected, S235.

A further exemplary embodiment would allow a premium modifier for different mortgage segments. An advantage to this is that as a lender profile fluctuates over a series of months, then this would allow for the fluctuation and also be a better match to the loans being insured (i.e., a lower premium on safer loans versus a higher premium on riskier loans). One way to accomplish this is to have a market segment matrix that has along one axis the market channel and along another axis the types of mortgages and segments of the mortgage market. The matrix may include multipliers to use to adjust the premium charged a lender based on the market segment and the overall premium for that lender. In at least one exemplary implementation that uses a lender rating, the matrix includes a submatrix for each rating level to more accurately allow the insurer to charge an appropriate premium for lenders with different ratings. One factor that will impact the different multipliers is the potential loss (or risk of financial loss) associated with different mortgage types.

Another exemplary embodiment adds the application of trends in the mortgage industry against the lender profile to determine whether a particular lender profile has had a change in risk. For example, if a lender primarily handles loans from the New York City area and there is an increase in mortgage fraud in the New York City area, then the risk of that lender profile increases. Conversely, if there is a decrease in fraud in the New York City area due to, for example, an increase in criminal prosecution resources to combat mortgage fraud, then the risk of that lender profile decreases. A change in risk then can be used to adjust the premium charged to the lender for future covered loans.

Another exemplary aspect of the invention includes providing training and consulting advice to lenders through the insurance entity or a contract vendor, S510. The training preferably includes best practices and fraud prevention information. Examples of fraud prevention information include red flags to look for in a loan application or types of information to look for in the loan application file and common fraud schemes, and the information also preferably includes how to address and combat fraud based on the red flags and known schemes. The training also preferably includes information on how to control the conduct of closing agents, for example, through the use of properly structured closing instructions. The consulting aspects preferably include reviewing controls and closing practices used by a lender and then the tailoring of training to address weaknesses or other problems that may be presented by the lender's controls and closing practices. Consulting in another embodiment includes advice on setting up of controls and closing practices including the drafting of the closing instructions.

Consulting and training in another embodiment includes the standardization of controls across lenders particularly controls that prove to be effective in combating misrepresentations and/or fraud. Over time as different lenders are exposed to the developed controls, an industry standard will be created.

As trends are learned and/or noticed, the insurer is able to create and fine-tune controls to take into account the trends. When the controls are improved and/or trends spotted, the insurer can provide this information to its insureds and also other entities that might subscribe to such information in the form of a newsletter or computer database. In at least one embodiment this information is incorporated into the training offered to the insureds.

If based on a review of a lender's files and/or information submitted as part of the insurance application process it is noticed that controls that exist and are in place at the lender are not being utilized fully, then the lender can be offered training for the relevant staff of the lender on the proper use of the controls to prevent fraud and other problems, S510. In addition, training can be offered in using trends to spot likely circumstances that might be a flag for or indicator of a misrepresentation. To provide a more comprehensive adoption of existing controls, training may be offered to the brokers that originate loans on behalf of the lender or correspondent who sells loans to the lender.

In at least one embodiment, the insurance program includes maintenance of a database that includes entities that based upon their respective histories are found to be ineligible to participate in mortgage transactions, S505. The ineligible database (or exclusionary database), for example, includes searchable databases and a paper publication(s). An alternative exemplary embodiment is for a list to be used as the database. Preferably, the database (or the list) is culled from a variety of sources including, for example, the U.S. Department of Housing and Urban Development Limited Denial Participation list (HUD LDP), investor ineligible lists that are received, internally compiled lists, fraud file reviews and claim file reviews performed as part of due diligence, parties indicted on mortgage fraud related criminal counts (e.g., wire fraud, mail fraud, etc.) as reported in a press release(s) and other media outlets, and other national lists available to the lending industry such as disciplinary actions reported by the Appraisal Subcommittee of the Federal Financial Institutions Examination Council (ASC) at www.asc.gov. More preferably, the ineligible database is searchable by state, party name, and the service provided (e.g., broker, appraiser, etc.). More preferably, the database is updated as information becomes available. The ineligible database may be provided to information subscribers. The ineligible database also may be used to perform analysis of lenders to see if there is any overlap between the entities used by the lender and the ineligible list with the resulting rating for the lender being negatively impacted.

Figure 2B:
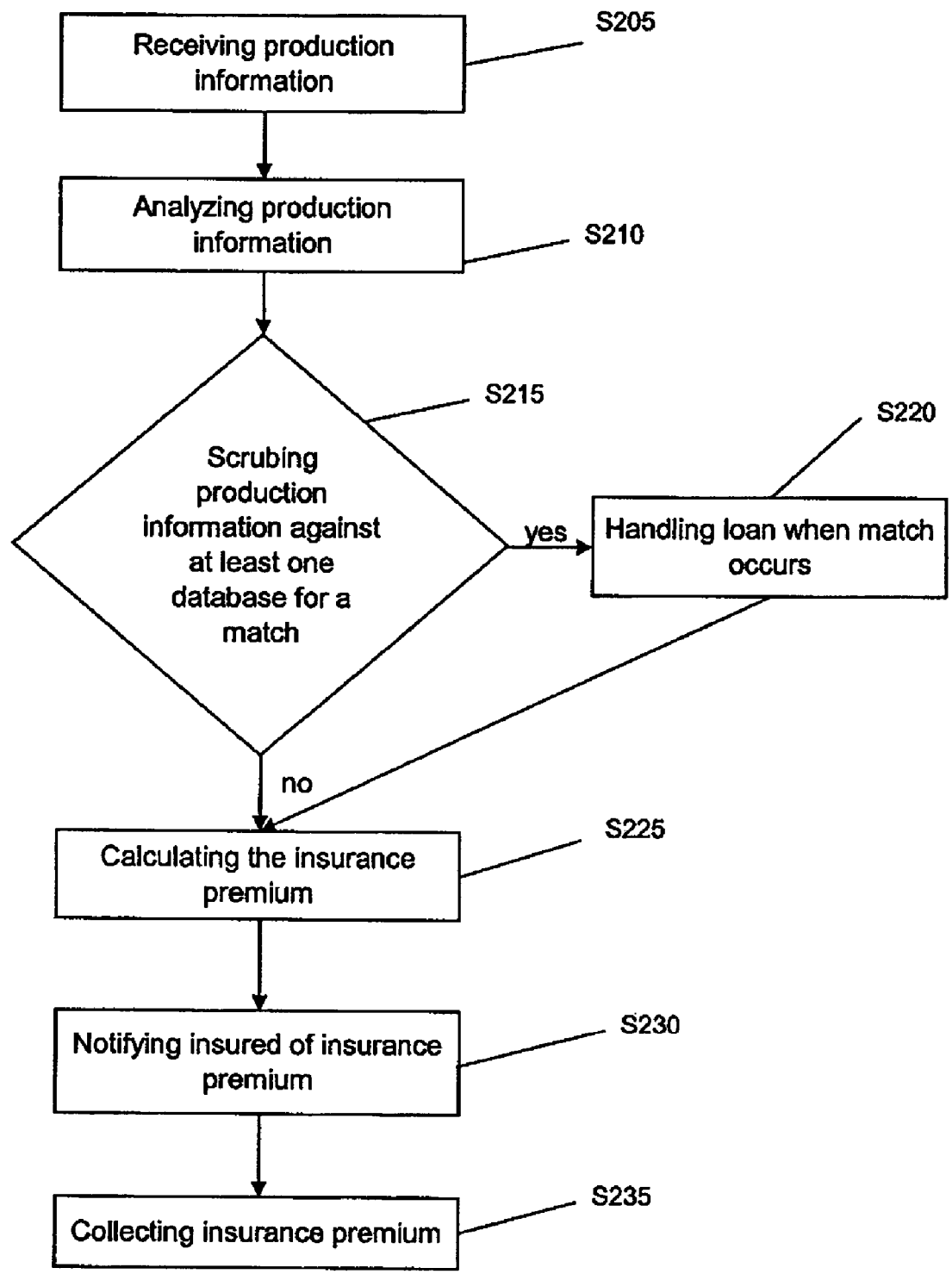

In at least one exemplary embodiment illustrated in FIG. 2B, loan information is scrubbed against the ineligible database(s) to see if there are any matches, S215. The scrubbing preferably occurs as part of the analysis in setting the insurance premium modifier based on the lender profile. Alternatively, the ineligible database is distributed to lenders having an insurance policy (or other entities such as information subscribers) for the lenders to scrub pending mortgage applications against, S505.

When the production information is received, the participating entities of each loan are compared to the ineligible database to see if there is a match, S215. When no match occurs for a loan, an insurance premium is calculated, S225. When there is a match, S220, there are a variety of options that may occur including, for example, a simple notification of this fact to the lender, a premium increase for that particular loan that would exceed the normal premium for that particular loan, a rejection of that loan for coverage, or exclusion from coverage of the portion of that loan the entity participated in. The simple notification may include a recommendation that the lender update their own ineligible list to include the particular entity and/or review the file for that loan to determine if there were any irregularities in the loan file in order to attempt to address the irregularity.

An approach in at least one exemplary embodiment is that for a certain period of time, for example, 60-90 days or 6 months (but shorter or longer time periods may be utilized), after a lender begins participation in the insurance program and/or after an entity, which caused the match, is added to the ineligible database, there is a grace period during which the lender is notified of the match. This alternative approach would allow the lender to learn more about the ineligible database and have the opportunity to use the database as part of its own procedures, since there is usually a lead time of a few weeks to a few months from the time a loan application is submitted to closing of the loan which means that a loan could currently be being processed that involves an ineligible entity in some capacity. The delay in use will minimize lender disruptions. Even if the grace period was to be utilized, the lender preferably can not ignore its own list of ineligible entities and consider the grace period to be a free pass.

An approach in at least one exemplary embodiment is that the lenders are required to utilize the ineligible database to scrub all loans handled by them, S505. When an addition is made to the ineligible database, then the lenders will have to scrub the addition against their currently pending loan applications that have not closed yet.

Another exemplary embodiment divides the ineligible list when the database is a list into multiple parts. For example, a first list would include entities that are ineligible because of involvement in a misrepresentation that leads to a claim, loss, etc. in the insurance program. This first list would be based on information provided to or learned by the insurance entity in the course of investigating coverage requests. When a match occurs with the first list, then the loan application will not be covered and should be denied until a replacement is found for the entity giving rise to the match. A second list would include information derived from public sources or other third parties (such as lenders' ineligible lists). The second list in at least one embodiment is an advisory list that requires a closer review of the loan application file, because of the involvement of an entity on the list. However, a match to either list could be a basis for denial of insurance coverage for the loan application.

Another exemplary embodiment adds additional databases to scrub loans contained in the submitted production information against either by the insurer and/or the lender, S215. An exemplary database is a loan database that includes information on the loans that have been submitted to the insurer for potential coverage with an alternative embodiment limiting the loans to those that were actually covered and not loans that were not designated and/or coverage was refused. Like the ineligible database, the loan database includes, for example, a computer database (listing and/or searchable) and/or a paper publication(s).

A scrub of new loans against the loan database may locate a match that is indicative of fraud such as the same property being sold in short succession for an inflated price or a neighboring property that was recently sold for a much lower price without major differences existing between the two properties. Another match might be of who the occupant is for the house being acquired with the new loan if that person is also listed as occupying another property that has not been sold or received a contract as this would potentially indicate a misrepresentation as to who the actual occupant is to be for the property being acquired with the new loan and/or is for the property purchased with the previous loan. Additional scrubbing preferably includes the property address and the identity of the borrower(s). If a match occurs, S220, then preferably a verification is done to see if the lender followed their own procedures and/or an insurance exclusion may be included to not provide coverage for what caused the match but otherwise provide insurance coverage for any other coverable misrepresentation. So for example, if the match was for occupancy and the financial loss was based on an incorrect occupancy, then there may be no coverage for this financial loss. But if the financial loss resulted from misstated income levels, then there would be coverage for the financial loss. Another example of a situation that can be located during a scrub is a property that has been sold or transferred at least once during the last year (or some other predetermined time) that would be indicative of a flip. If this situation is detected, then the insurance coverage may exclude from coverage inflation of the property value and other issues that relate to flipping. Under either example, the lender may be contacted to determine whether the controls were used properly. If the controls were properly used, then to determine whether there is documentation in the file to show that the match was based on incorrect/inaccurate information. If after reviewing the lender file, the information in the database is found to be incorrect/inaccurate, then to include the cause for the match in the coverage. A benefit to addressing the match at this stage is that if the reason for the match did lead to a financial loss, coverage would probably be denied because the match is indicative of a mistake that occurred during closing that if closing was performed properly the reason for the match would have been uncovered. Preferably, if there is a coverage exclusion, then there is no reduction in the premium for the loan in question.

Another possible match that might arise is that the loan in question already is covered by insurance paid for by another lender in the situation where the submitting lender (or requesting entity) buys loans from other lenders to then sell to investors. In this situation, the second lender preferably is not charged a premium since coverage already exists for the loan. In the situation where there is a repurchase request for this loan, the repurchase request will likely be pushed back to the prior lender (i.e., the lender that has insurance coverage closest to the origination of the mortgage) for a claim to be made by that lender.

Figure 3A:
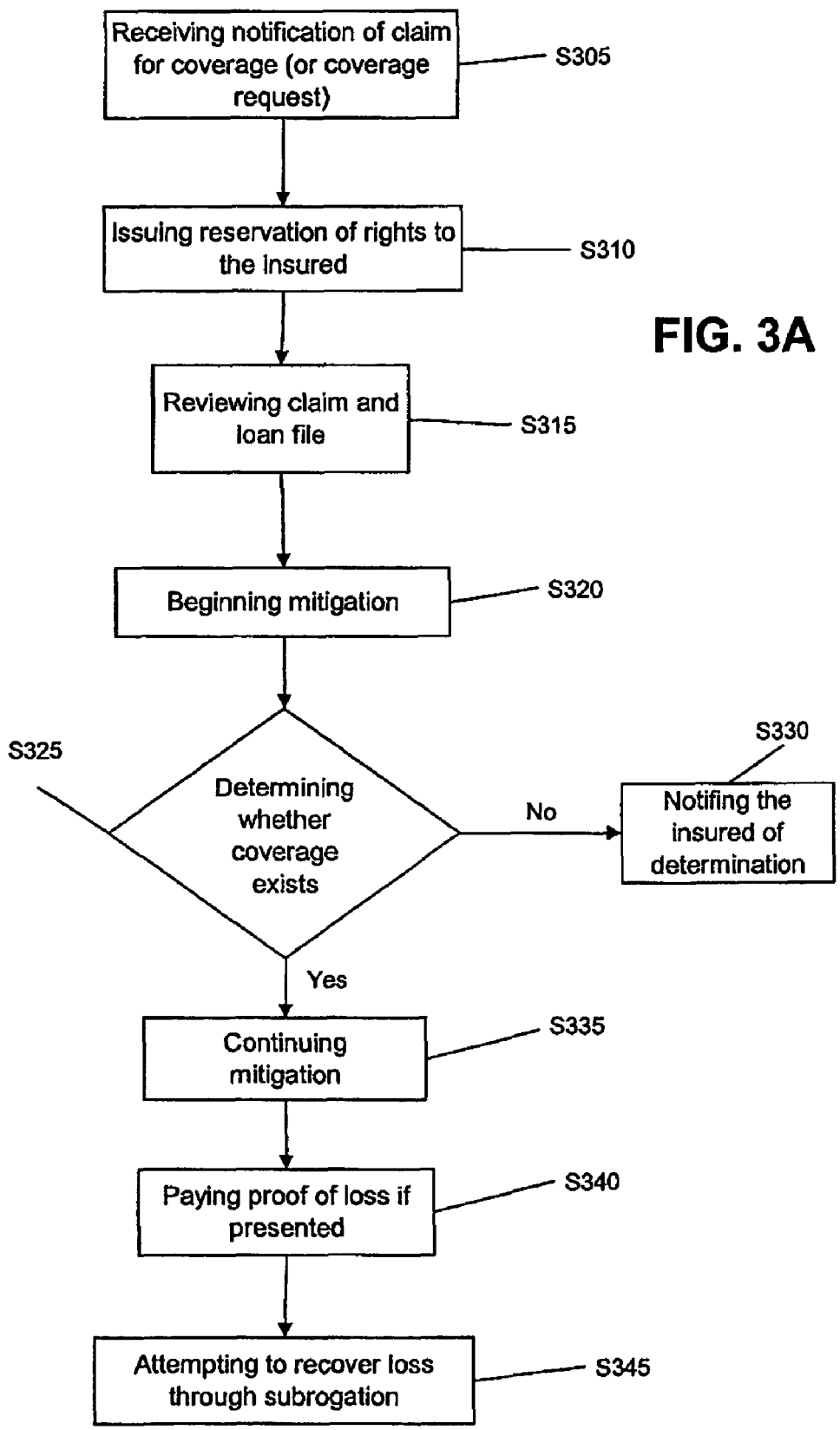

The possibility exists when an insurance policy issues that a claim (or coverage request) will be made against it. As such the invention includes a method and a system for handling claims for coverage when a repurchase request is made or other covered financial loss occurs, and an exemplary embodiment is illustrated in FIG. 3A. The claims handling portion of the invention in at least one embodiment includes providing legal counsel to the lender as part of the insurance program to determine possible avenues of recovery of the losses suffered by the lender including representation in recovering those monies. In those embodiments, the legal counsel would perform these services in addition to recovery of the losses incurred by the insurance entity and/or insurance carrier.

The claim handling aspect of the exemplary embodiment begins with receiving notification of a claim from the lender based on a repurchase request or other covered financial loss, S305. Preferably as illustrated, upon receipt of the claim, the insurance entity conducts a preliminary review to ascertain if the loan is insured, and issues a reservation of rights to the insured when the loan has been and remains insured, S310.

Preferably the claim and loan file are reviewed, S315, and mitigation is begun as information is learned during the review, S320; and as such these steps may be performed at the same time, in the illustrated order, or in reverse order depending upon the circumstances and the implementation used. The mitigation process is more fully developed and discussed below, but preferably as part of the insurance program the insurance entity makes use of a legal team to assist in the file review and mitigation of a claim.

One of the initial steps of the review, S315, is to compare the loan origination process with the process dictated by the requirements of the insurance agreement. Examples of the insurance agreement requirements include use of the controls that were in existence at the time the insurance application was submitted, use of an ineligible list, and any other conditions incorporated into the insurance agreement. The review, S315, preferably includes reviewing the loan file to determine what the misrepresentation was, to see if all of the procedures were followed, and to determine whether there was any type of collusion and whether it involved the lender or not. This review may be performed by an entity other than the insurance entity, for example, outside counsel. The review is looking for an explanation as to what happened, for example, from a fraudulent loan that was able to circumvent the lender's correct use of its existing controls to a situation where collusion exists among some of the entities that participated in procuring and/or closing the loan. Sometimes even when all reasonable care is taken in using the existing controls, a misrepresentation by the borrower occurs due to no fault of the lender or the other entities that participated in the loan process. At the other extreme is where there was outright collusion between the borrower and other entities to obtain the loan through misrepresentation that can include, for example, misstatements as to income and/or employment, a straw man as the borrower, and carelessness in using the controls that are in place with the lender and/or broker.

Figure 3B:
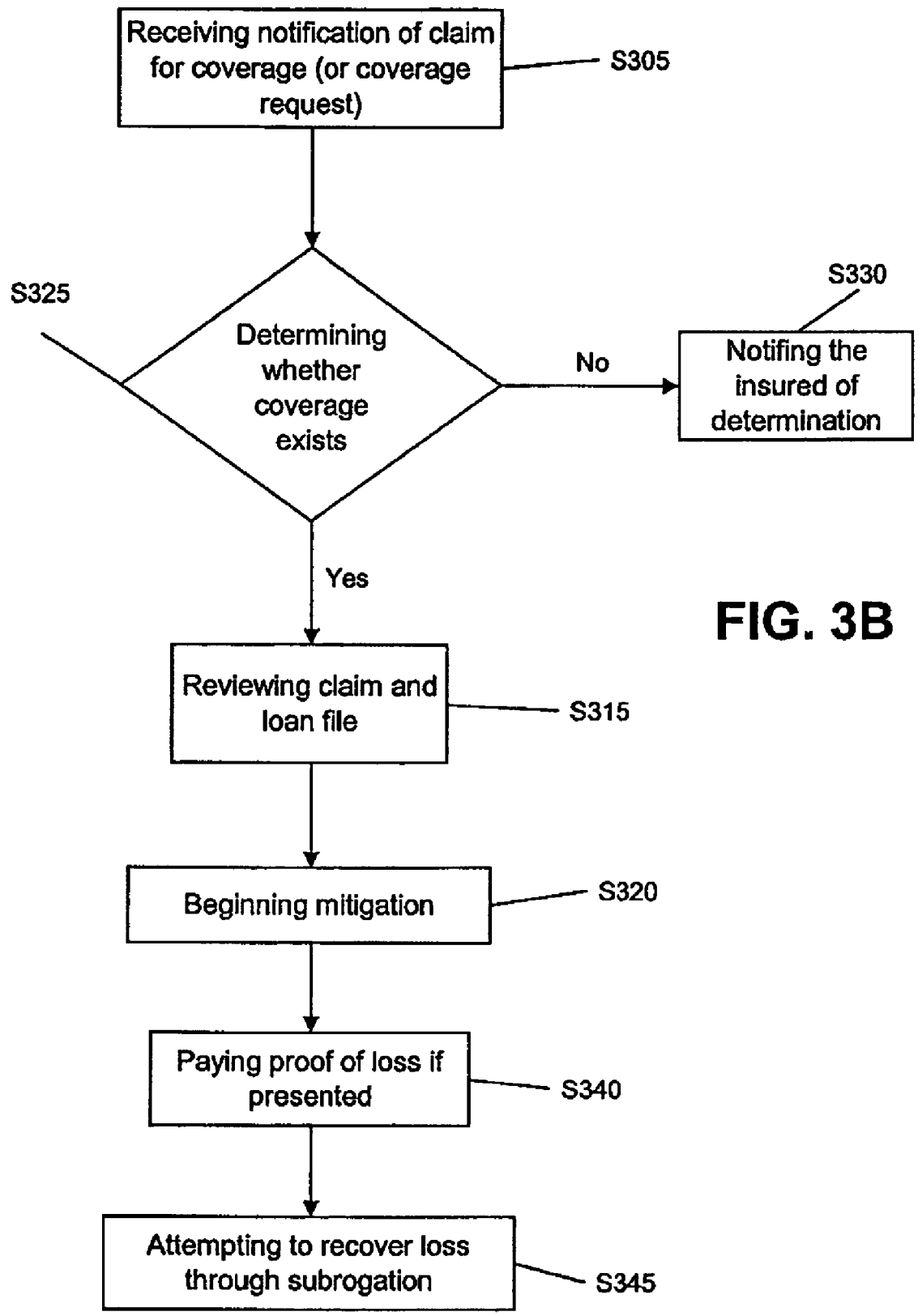

Based on this review, a determination can be made whether insurance coverage exists or alternatively to provide coverage or reject the claim, S325, based on whether the risk that gave rise to the financial loss was covered. If the determination is that there is no coverage, then the insured is informed of this, S330, and the circumstances around the repurchase request or other financial loss may be used as a teaching example and included in analysis for finding trends in the mortgage industry. Even if the claim is denied, the insured preferably receives the benefit of the mitigation and formulated strategy up to that point and in one embodiment is given the opportunity to retain the legal counsel at the insured's expense to pursue mitigation and possible loss recovery. If it is determined there is coverage of the claim, then preferably attempts to mitigate are continued, S335. As illustrated in FIG. 3B, sometimes there is a request for coverage that is clear cut such as the loan is not covered by an insurance policy or the loan is covered with evidence of a misrepresentation being made to the insured, such that there is no need to issue a reservation of rights letter and mitigation, S320, may begin as part of the review process, S315. Under this situation, the coverage determination, S325-S330 is made when the coverage request is received.

If a proof of loss is presented, then paying the loss, S340. The proof of loss preferably includes the discount between the mortgage value and 1) the sale price of the property through a scratch and dent sale, 2) the foreclosure sale price, or 3) refinanced mortgage value. The proof of loss also includes any expenses incurred by the repurchase requester (if based on a repurchase request) and any accumulated interest on the loan at the time of the disposition of the loan. The insurer then preferably attempts to recover any loss through subrogation, S345. As with mitigation, possible recovery sources include the participants in the loan procurement and closing such as the title company, bond issuers for the appraiser and the closing agent, and the borrower. The subrogation process is an extension and continuation of the mitigation strategy.

Mitigation, S320, S335, of the claim preferably is handled by a legal team. Mitigation of the potential exposure to the insurer begins by looking into possible recovery sources including: participants in the loan origination, procurement, and/or closing; foreclosure; a scratch and dent sale of the loan; and/or refinance the property through the originating entity although the options are impacted by circumstances of the basis for the particular financial loss. The invention preferably includes the use of several tools to control losses to the insurance entity, which may be the insurer depending upon the implementation used, and lenders. Several of the tools may utilize outside counsel to recover the subrogation amount and any other loss including losses above the subrogation amount incurred by the lender(s). The easiest mitigation prong is to refinance the loan through the origination source such as the broker and pay off the original loan. The more difficult mitigation prong is to investigate the loan file and the events around the loan to determine which participants have liability and/or are capable of contribution to cover the anticipated (or known) loss with the next step being asset recovery to cover the anticipated (or known) loss.

The foreclosure option begins with obtaining a market valuation to determine what the potential exposure is if foreclosure were to occur. Examples of a market valuation include a broker price opinion or an automated review of computer databases to determine the value of the property. The results of the market valuation will greatly impact the overall strategy as this will provide an indication of what is at risk and will need to be recovered from other entities and/or covered by the insurance carrier.

Recovery from other participants begins with making a decision on commencing legal action against, or at a minimum beginning negotiations with, individuals believed culpable in the misrepresentation and who are viewed as having resources available for payment of money to mitigate any losses. Possible recovery sources include the bonded/insured individuals and the entities that bonded/insured the entities/individuals that participated in the misrepresentation. This case becomes stronger if there is an entity that did not follow the instructions provided by the lender, for example, if the title agent and/or closing agent did not follow the closing letter/instructions from the lender, this would bolster the claim against them.

Another available option, most likely as part of a negotiation strategy, is to have the entity that originated the loan assist the borrower in refinancing the property and thus obtain a payoff of the loan in a quicker manner than is possible through foreclosure. This is an option when the financial loss is based on a misrepresentation that does not prevent the borrower from obtaining a new loan at a different interest rate, a different document type, or a different LTV.

Another possibility is to work out a negotiated settlement between the investor, the lender, and the insurer such that any loss is shared between the three entities in the spirit of cooperation and possible recognition of a long-term relationship that may exist between the investor and the lender. Or as part of the negotiations, the investor agrees to hold the property through foreclosure or other mortgage disposition in return for having any of its losses covered instead of having the loan repurchased as requested in 30 days, which is the typical period for completing the loan repurchase.

Another possibility is to sell the loan in question on a "scratch and dent" basis, which means to sell the loan with all of the associated problems at a price below market price. An example of this type of sale is where the loan is sold to a buyer who pays a discounted price for the loan such as 85 cents on the dollar. This type of sale facilitates the removal of the loan from the lender's portfolio and the accumulation of losses to the insured, the insurance entity, and the insurer as a result of unpaid interest, foreclosure expenses, marketing expenses and so on. Through the reduction of these realized losses to lenders, there is a corresponding reduction on the potential loss to the insurer. To potentially maximize recovery (in part through reducing transactions costs), loans at risk for a financial loss based on a misrepresentation may be grouped together and sold as a lot (or pool) to a buyer.

A further exemplary embodiment adds analyzing the claim to determine whether there are any new trends occurring when taking the current claim with other claims and changes in the marketplace. When a trend is found, then a variety of things can occur. First, the establishment of the trend can be used to further refine and improve recommended controls or the controls used by the lenders participating in the insurance program. A second related use is to further analyze the trends for ways to improve the controls and/or loan practices to counteract and/or take advantage of the trends. A third use is to let the lenders and other entities such as entities that subscribe to such information know of the existence of the trend.

A fourth use is to take a proactive approach based on trends by checking with loan servicing entities to see if there are loans that have an entity (such as the borrower, the appraiser, the broker, or closing agent) in common with a loan that a financial loss will occur with and that fall within a given trend and are delinquent, because delinquency is a precursor to a repurchase request or other financial loss. The next step if there is a delinquency is to obtain a broker price opinion on the property to see if the property value is sufficient to cover the mortgage principal, which if it is, then a wait and see approach can be taken since there is less risk to being able to recover sufficient monies to cover the financial loss. However, if the broker price opinion indicates that the property is upside down (i.e., the property is worth less than the loan), then the property could be grouped together with other loans that are similarly situated. These loans along with the loan on which there is a risk of a financial loss in at least one exemplary embodiment are combined together in making a claim against the entity(ies) that was involved with these loans for a settlement on all of the loans, if there is a potential basis for recovery.

A still further exemplary embodiment adds adjusting the premium modifier for lenders who are impacted by the new found trend and/or share similar controls and profiles to lenders that are incurring financial losses based on a misrepresentation.

In at least one embodiment, another situation that may be covered by the insurance with an appropriate endorsement is when a loan is approved for coverage and the premium is paid for the coverage, the loan turns out to be unsaleable because a problem is found during the post-closing quality control by the lender. In most situations, lenders operate using a warehouse line that provides them with the money to be able to close loans and then turn around and sell that same loan to an investor. The problem is that the loans can typically stay on the warehouse line for a limited period of time such as sixty (60) days, which is typically not a problem unless the loan can not be resold. This situation would be handled similar to a repurchase request when the endorsement is used and the warehouse lender tells the lender to get the loan off the warehouse line.

Another exemplary embodiment adds notifying the insurance carrier 730 of the possible loss to allow a reserve to be set simultaneously with or after, for example, issuance of the reservation of rights, S310, or determining that coverage exists, S325.

Figure 4:
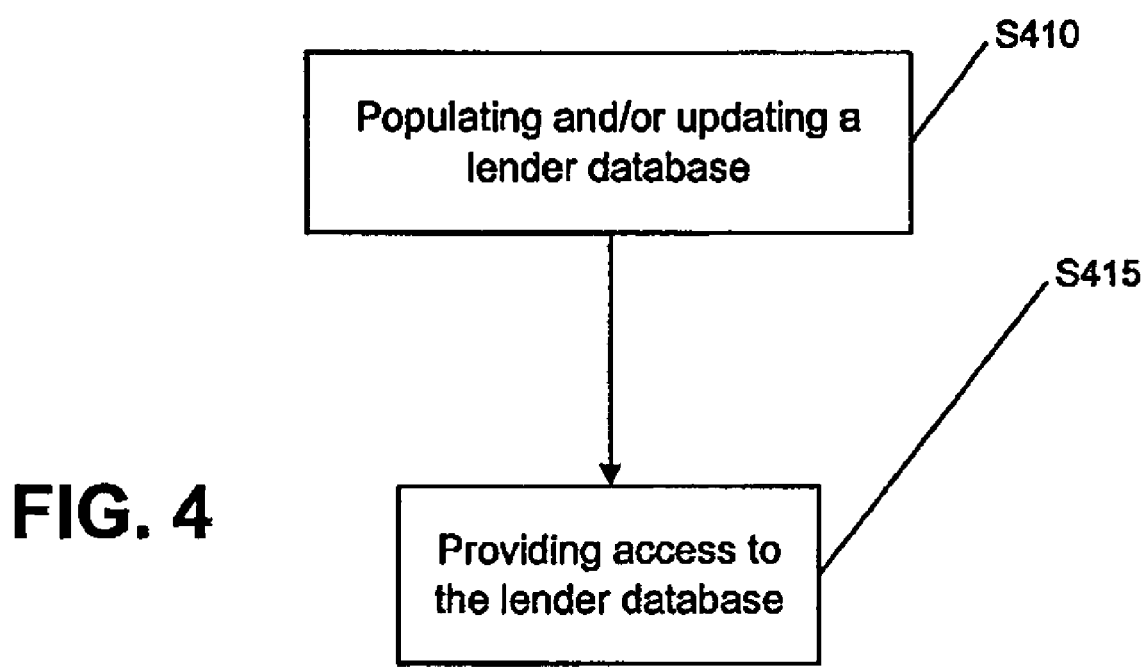

FIG. 4 illustrates an exemplary method for providing a database containing information about lenders for access by lenders and/or other information subscribers. The lender database in at least one embodiment is included as part of the insurance program. The lender database provides information that allows a comparison to be made between lenders, for example, in terms of loan profile and performance, and allows for the comparison to be done of similar lenders, for example, in terms of loan size and loan products. The comparison information, for example, includes claims made by the lender (or requests for coverage), loan production numbers, and other relevant information that may be provided with identification information of the lender including name or artificial code to prevent identification of a competitor lender by name. The comparison information alternatively may be provided with identifying information of the lender removed. The information may also be presented as industry derived numbers with breakouts based on geography, size, averages, medians, and/or percentage segments. The method begins with populating and/or updating a lender database with information derived from insurance applications, production information, and claims, S410. Providing access to the lender database to insured lenders and/or other information subscribers through, for example, computer readable medium, a website, and/or a newsletter/bulletin, S415. The lender database access includes accepting search queries and displaying the search results to the user.

Figure 5:
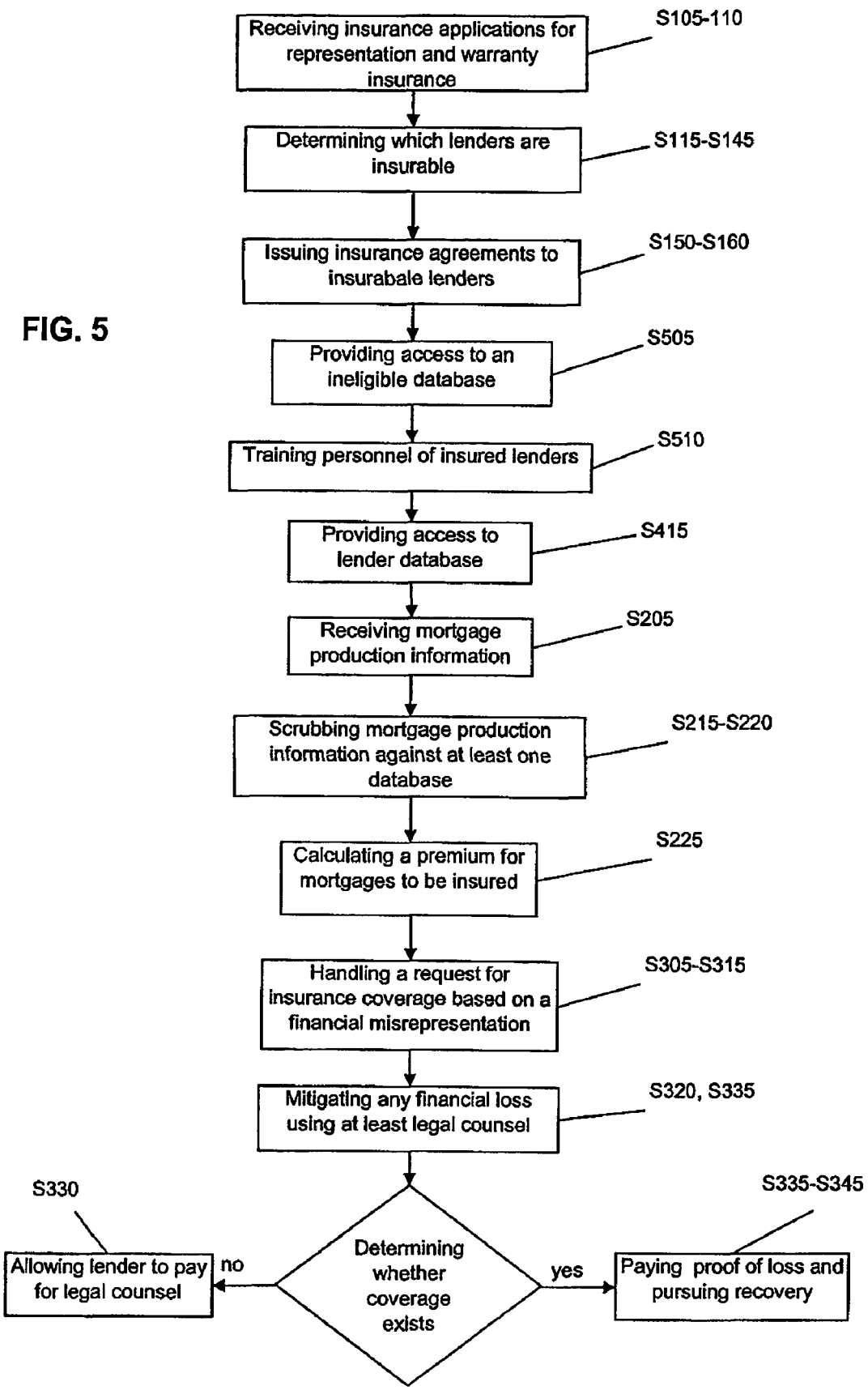

The methods illustrated in FIGS. 1-4 and the embodiments described above together form an insurance program for representation and warranty insurance for lenders in the mortgage industry. FIG. 5 illustrates a method for an exemplary insurance program for representation and warranty insurance for lenders in the mortgage industry to cover a financial loss as a result of material inaccuracies in the financial information provided by or on behalf of the borrower. One of ordinary skill in the art based on this disclosure will appreciate that the illustrated order of steps in FIG. 5 is an exemplary order as most of the steps may be reorder, rearrange, and/or simultaneously performed (or grouped) with at least one other step.

Figure 6:
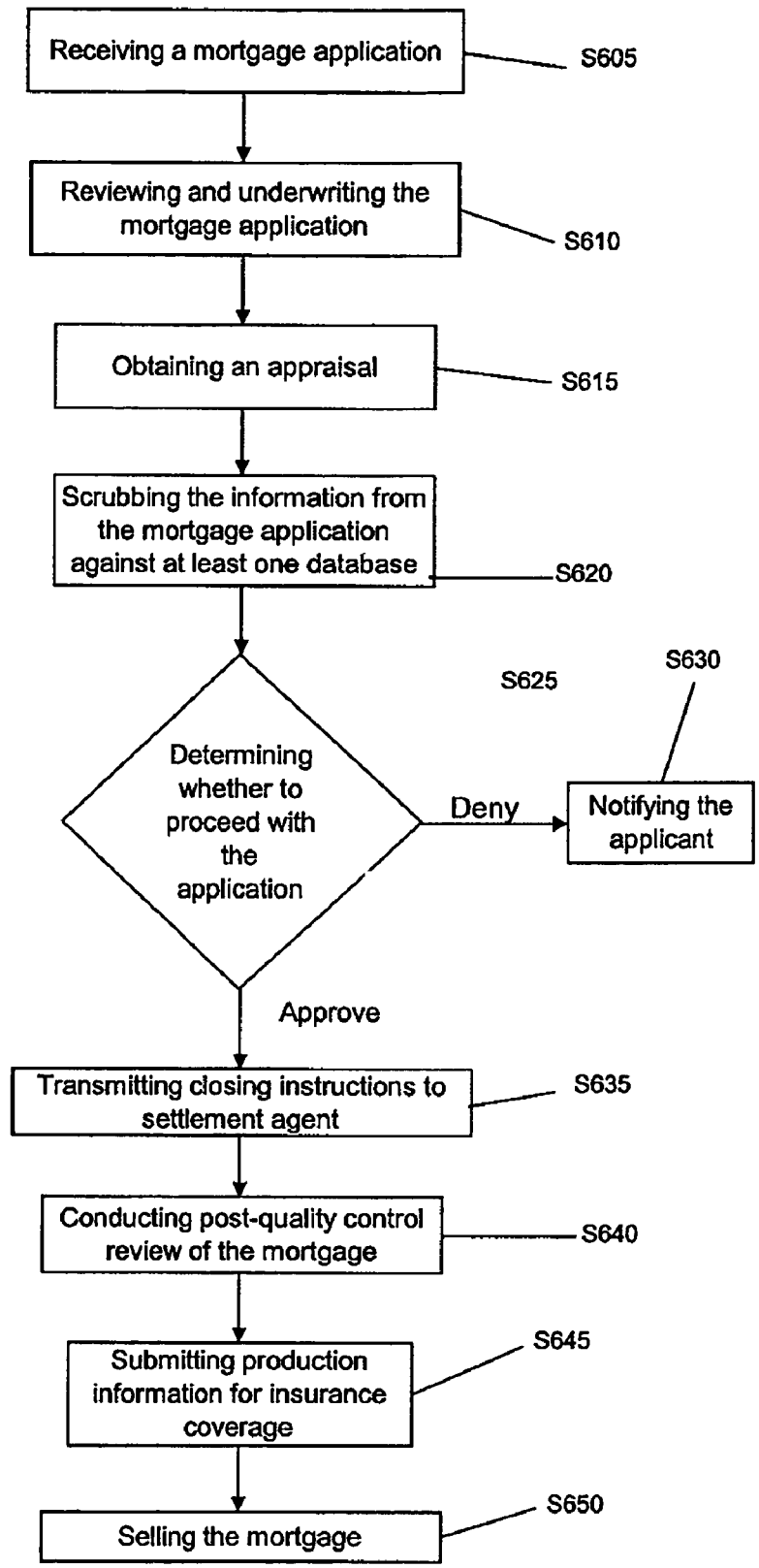

The insurance program in at least one embodiment includes a method for lenders to process new mortgage applications and obtain insurance for closed loans as illustrated in FIG. 6. The lender begins the process by receiving a mortgage application from a perspective borrower, S605. The lender reviews the mortgage application including underwriting the application or having another entity perform the underwriting, S610. An appraisal of the property that will be subject to the loan is obtained, S615. Information from the mortgage application and the participants in the closing of the loan is scrubbed against an ineligible database(s) that preferably is provided by the insurer as part of an insurance program, S620. In at least one embodiment, other participants that will participate in the mortgage transaction including at least one of the following: the appraiser, the title company, the settlement agent, and the real estate agent(s) are also scrubbed against the ineligible database. If a match occurs with the ineligible database, then the lender does at least one of the following: denies the mortgage application, conducts further investigation, and requires the applicant to find a replacement entity for the entity that caused the match assuming the applicant was not the source of the match. Steps S610-S620 may be performed in any order or simultaneously or two of the three steps may be done concurrently. Steps 610-S620 if performed in accordance with the invention are to be performed using the agreed to controls that are a condition of the insurance agreement. In at least one embodiment, information from the mortgage application is scrubbed against a loan database with information relating to prior loan transactions for matches as discussed above. If there is a match between the mortgage application and the loan database that indicates a misrepresentation, then determining whether the lender wants to proceed by assuming the risk for any mortgage (since the mortgage will not be covered in the insurance program) that results from the mortgage application or investigating the reason for the match to confirm there was no misrepresentation, S625-S630. Alternatively, the lender may decide to deny the mortgage application, for example, either because it does not want to assume the risk or further investigation confirms that there has been a misrepresentation. If the lender decides to proceed with the mortgage application, for example, because it will assume the risk, further investigation determined there was not a problem, or the mortgage application does not produce a match; then the lender transmits instructions to the settlement agent for handling the mortgage closing and transfer of monies, S635. Conducting post-closing quality control of the loan after closing, S640. Submitting the loan as part of the production information for insurance coverage, S645. Selling the loan to another entity, S650. Steps S640-S650 may be performed in any order or simultaneously or two of the three steps may be done concurrently.

FIGS. 7A-7D illustrate block diagrams showing exemplary business structures and relationships between different entities for performing the above-discussed methods that are illustrated in FIGS. 1-5. The various illustrated entities are connected to other entities through, for example, contractual relationships, predefined contractual interfaces, and business unit relationships.

Figure 7A:
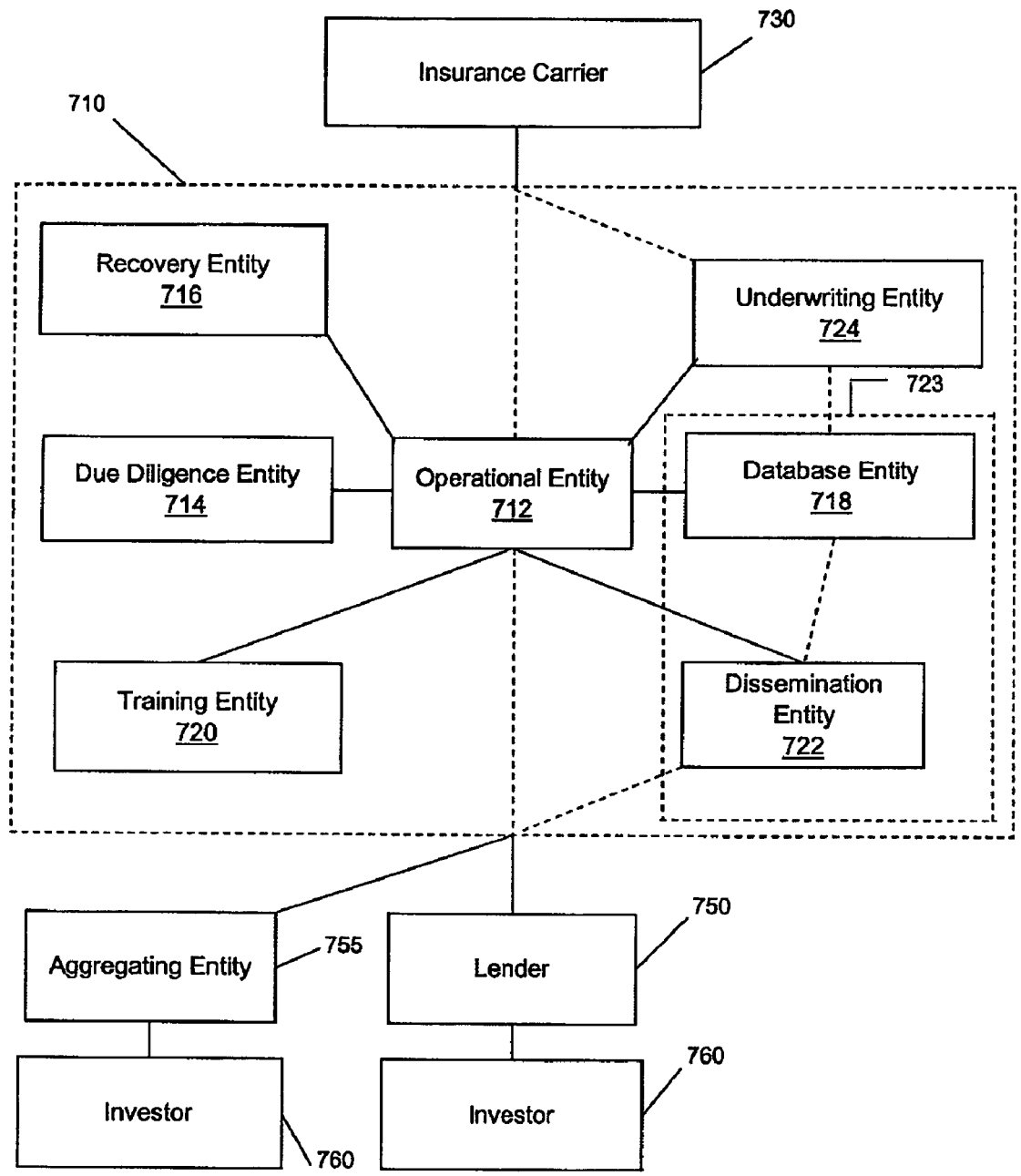
FIGS. 7A-7D depict block diagrams of exemplary embodiments according to the invention.
Figure 7B:
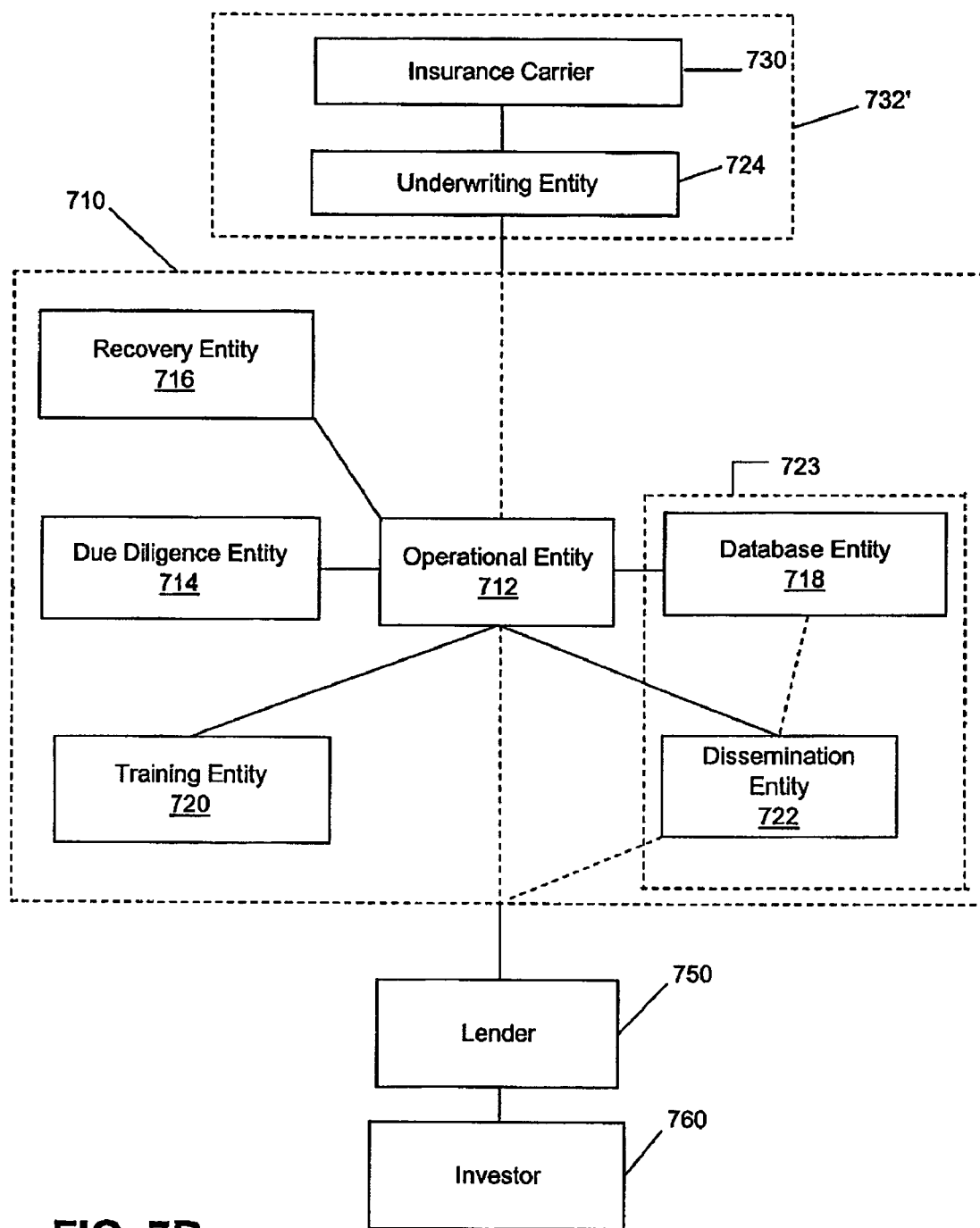
Figure 7C:
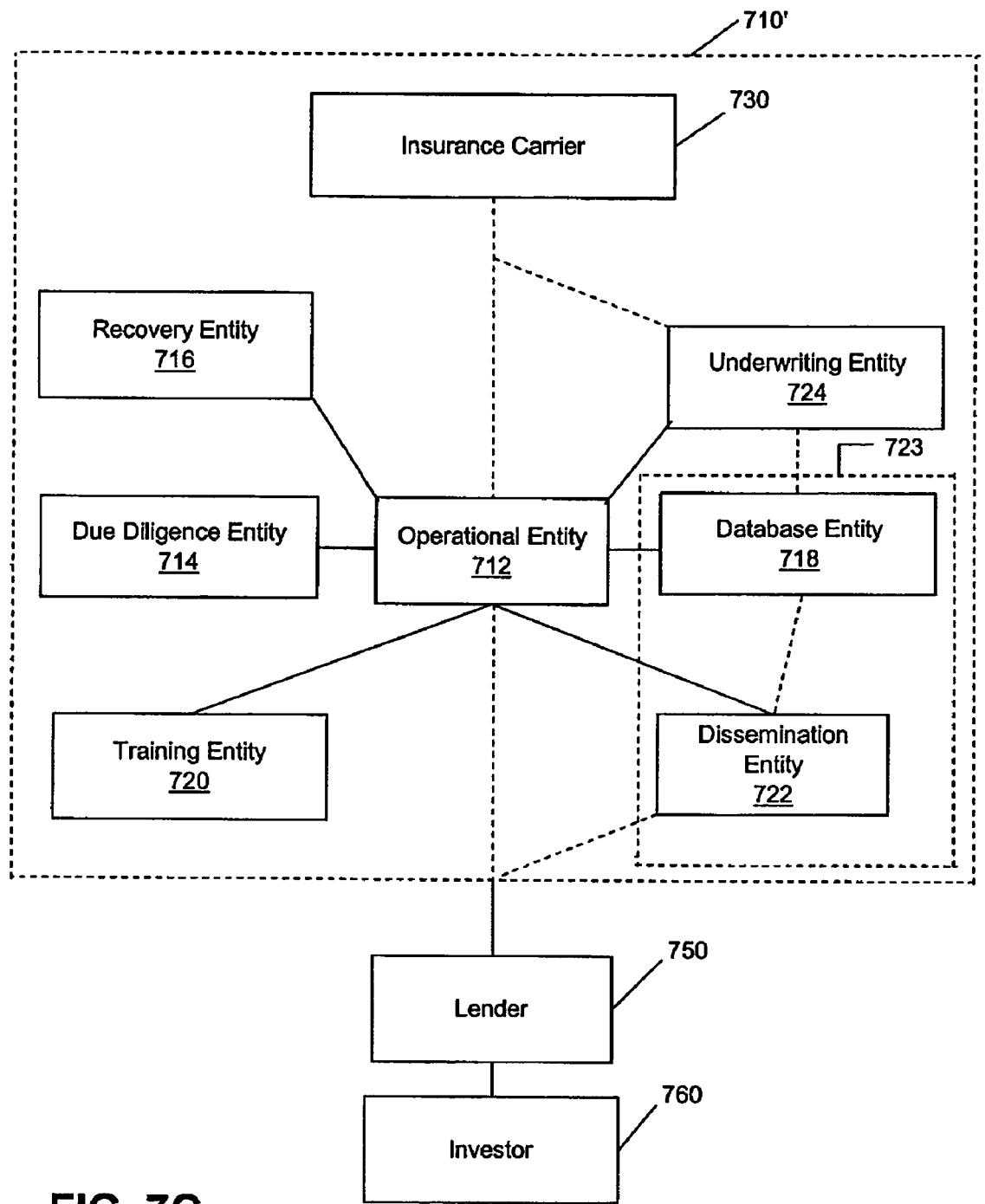

The insurance enterprise (or insurance entity) 710 is the conduit through which the insurance program is implemented and provided to lenders 750 or aggregating entity (or aggregator) 755 through contractual relationships that have predefined contractual interface(s) defining the relationship. One of ordinary skill in the art will appreciate that although only one lender 750/aggregating entity 755 and investor 760 are illustrated in FIGS. 7A-7D there can be a plurality of lenders 750/aggregators 755 each having an insurance agreement relationship with the insurance enterprise 710 and each lender 750/aggregator 755 could work with multiple investors 760 instead of the illustrated one to one relationship. The insurance enterprise 710 has arrangement(s) (or contractual relationship(s)) with at least one underwriting entity (or underwriter) 724, or as illustrated in FIG. 7A the underwriting entity 724 may be a part of the insurance enterprise 710 or, alternatively, the underwriting entity 724 may be separate from the insurance enterprise 710 (not shown). The insurance enterprise 710 and/or the underwriting entity 724 have arrangement(s) (or contractual relationship(s)) with at least one insurance carrier 730. The insurance carrier 730 and the underwriting entity 724 in at least one embodiment may be part of one entity 732' as illustrated in FIG. 7B or, alternatively, included within the insurance enterprise 710' as illustrated in FIG. 7C. These arrangements have predefined contractual interface(s) defining the relationship such that the insurance carrier 730 provides money to pay any covered losses relating to repurchase requests in exchange for payment of monies from the insurance enterprise 710 that are based on collected premiums from lenders 750.

The insurance enterprise (or insurance program system) 710 is an exemplary entity that is capable of performing the methods illustrated, for example, in FIGS. 1-5, and as the insurance enterprise 710 is illustrated in, for example, FIG. 7A may include a variety of sub-entities. The illustrated insurance enterprise 710 includes an operational entity 712, a due diligence entity 714, a recovery entity 716, a database entity 718, a training entity 720, a dissemination entity 722, and the underwriting entity 724. As discussed above, each of these sub-entities may be combined in a variety of ways depending upon the actual implementation, and some exemplary combinations are discussed below. Furthermore, the sub-entities may include, for example, contracted entities that are separate from the insurance enterprise 710, for example, the legal team may be an outside law firm and the due diligence entity 714 may be a separate entity such as a vendor. Each of these entities may further include a designated agent for handling the interrelationships between the entities themselves and entities external to the insurance enterprise 710.

The operational entity 712 preferably is the hub for the other insurance enterprise entities, which in the illustrated embodiment are on spokes. The operational entity 712 makes contact with or is contacted by lenders 750 who are interested in insurance covering repurchase requests, inability to sell a mortgage, and/or diminution in value of a portfolio loan. For example, FIG. 1 illustrates a method that may be performed by operational entity 712 in establishing a contractual relationship via an insurance agreement with the lender 750. As part of this process, the operational entity 712 uses the due diligence entity 714 to perform due diligence and provide the risk assessment (or rating) of the lender 750 and the underwriting entity 724 provides underwriting services for the insurance agreement. The establishment of the risk classification, which is based on the risk assessment, for a lender 750 in the illustrated embodiment is established by the operational entity 712 and/or the due diligence entity 714 or alternatively a subgroup of individuals taken from one or both of these entities. As discussed above, the operational entity 712 could include the due diligence entity 714 as part of it.

Figure 9:
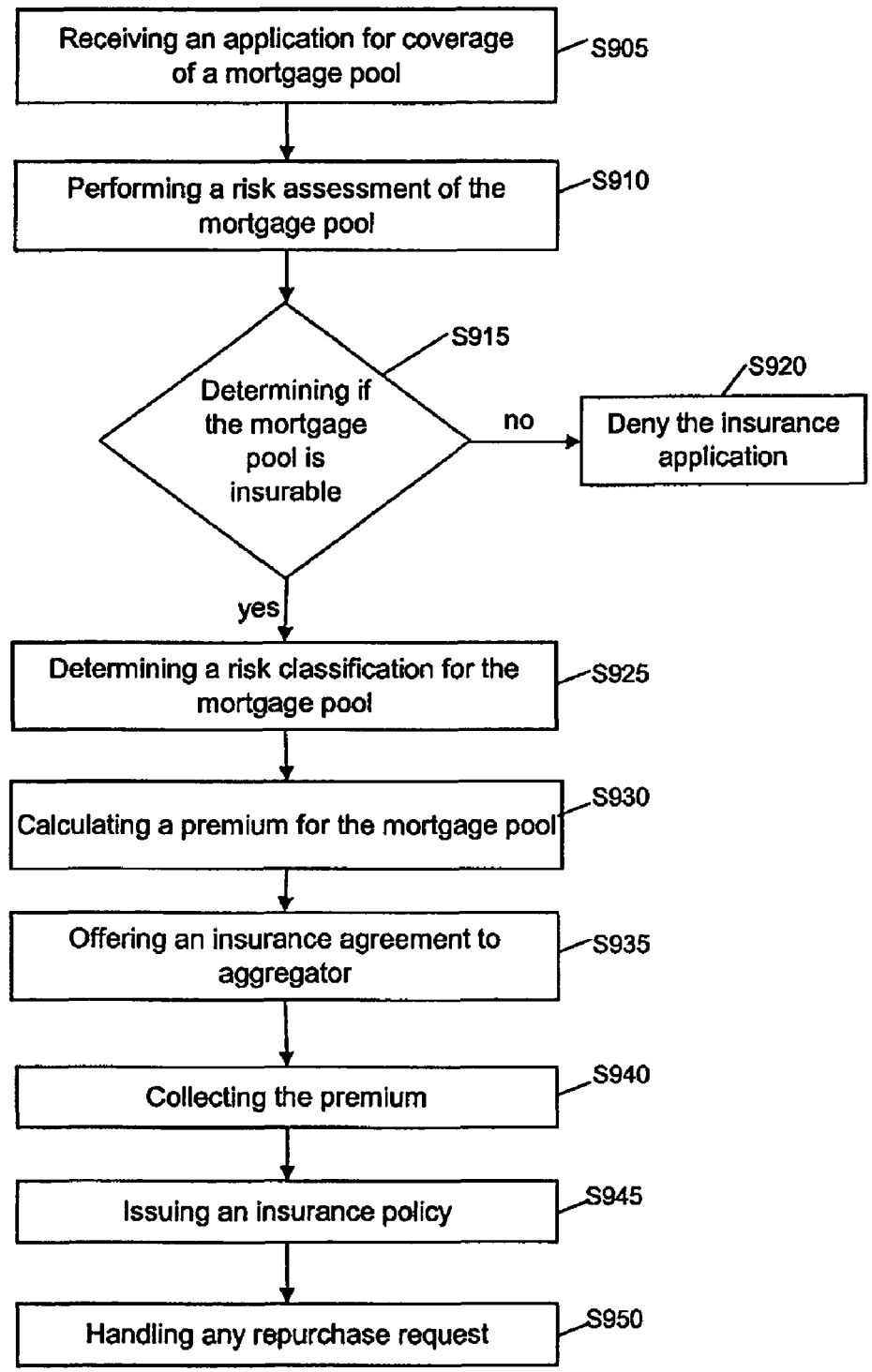
FIG. 9 illustrates a flowchart depicting an exemplary embodiment according to the invention.

The operational entity 712 makes contact with or is contacted by aggregators 755 who are interested in insurance covering repurchase requests, inability to sell a mortgage, and/or diminution in value of a portfolio loan. For example, FIG. 9 illustrates a method that may be performed by operational entity 712 in establishing a contractual relationship via an insurance agreement with the aggregator 755. As part of this process, the operational entity 712 uses the due diligence entity 714 to perform due diligence and provide the risk assessment (or rating) of the aggregator 755 and the mortgage pool assembled by the aggregator 755 and the underwriting entity 724 provides underwriting services for the insurance agreement. The establishment of the risk classification, which is based on the risk assessment, for the aggregator 755 in the illustrated embodiment of FIG. 9 is established by the operational entity 712 and/or the due diligence entity 714 or alternatively a subgroup of individuals taken from one or both of these entities. As discussed above, the operational entity 712 could include the due diligence entity 714 as part of it. The operational entity 712 based on the risk assessment would determine the insurance premium for the mortgage pool, inform the aggregator 755 of the premium amount, and collect the premium from the aggregator 755.

As illustrated in FIGS. 7A-7D, the operational entity 712 along with the due diligence entity 714, which may be replaced by an analysis entity, would perform the exemplary method illustrated, for example, in FIG. 2. Although the operational entity 712 may perform this method without the assistance of other entities within or associated with the insurance enterprise 710. The operational entity 712 under the insurance agreement, which serves as the predefined contractual interface, would receive production information from each lender 750. The operational entity 712 then would perform the analysis or calculations although either or both of these steps could be performed by the due diligence entity 714 through the use of a business unit relationship or other interface. The operational entity 712 would provide notification to and collect the insurance premium from the lender 750 as provided for in the insurance agreement, which defines the contractual relationship. In at least one embodiment, the loan production information is provided to the database entity 718 through a business unit relationship with the operational entity 712. The loan production information is added to a loan database. The business unit relationship allows for the operational entity 712 to search the loan database maintained by the database entity 718. In at least one embodiment the due diligence entity 714 has business unit relationship with the database entity 718 for access to the loan database.

As illustrated in, for example, FIG. 7A, the operational entity 712 along with the recovery entity 716 would perform the exemplary method illustrated in FIG. 3. Although the operational entity 712 may perform this method without the assistance of other entities within or associated with the insurance enterprise 710. A business unit relationship or predefined contractual interface exists between the operational entity 712 and the recovery entity 716 such that the recovery entity 716 provides recovery services to the operational entity 712 to mitigate any potential loss from a claim filed by an insured (a lender 750 or an aggregator 755) and the insurance carrier 730 and/or provide subrogation services to the operational entity 712 and the insurance carrier 730 after a proof of loss is paid. These services are provided to the operational entity 712 for potential subsequent delivery to the insured or the insurance carrier 730 depending upon the timing of the services being performed. The business unit relationship provides for operational entity 712 to provide information relating to a claim that is received from the insured. The recovery entity 716 may also provide file review services to the operational entity 712 through the above relationship or a second business unit relationship to allow the operational entity 712 to issue a reservation of rights letter to the insured. This file review preferably is done as part of the recovery services to allow a recovery strategy to be formulated. If a determination is made that the claim is not covered by the insurance agreement, then the insured is given the opportunity to establish a contractual relationship with the recovery entity 716 separate from the relationship established through the insurance agreement to continue to pursue potential recovery to offset the repurchase request outside of the insurance agreement and at the lender's expense.

The operational entity 712 and the insurance carrier 730 have a predefined contractual interface that when the operational entity 712 receives a proof of loss for a covered claim from the insured that the proof of loss within coverage limits is then presented to the insurance carrier 730 for payment to the operational entity 712 for subsequent delivery to the insured who presented the proof of loss. Alternatively, the payment may be made direct to the insured from the insurance carrier 730. If the proof of loss is in excess of the coverage limits, then potentially denying any payment in excess of the coverage limits. The contractual interface between the insurance carrier 730 and the operational entity 712 includes payment of an amount of money based on the collected premiums from insureds.

Figure 7D:
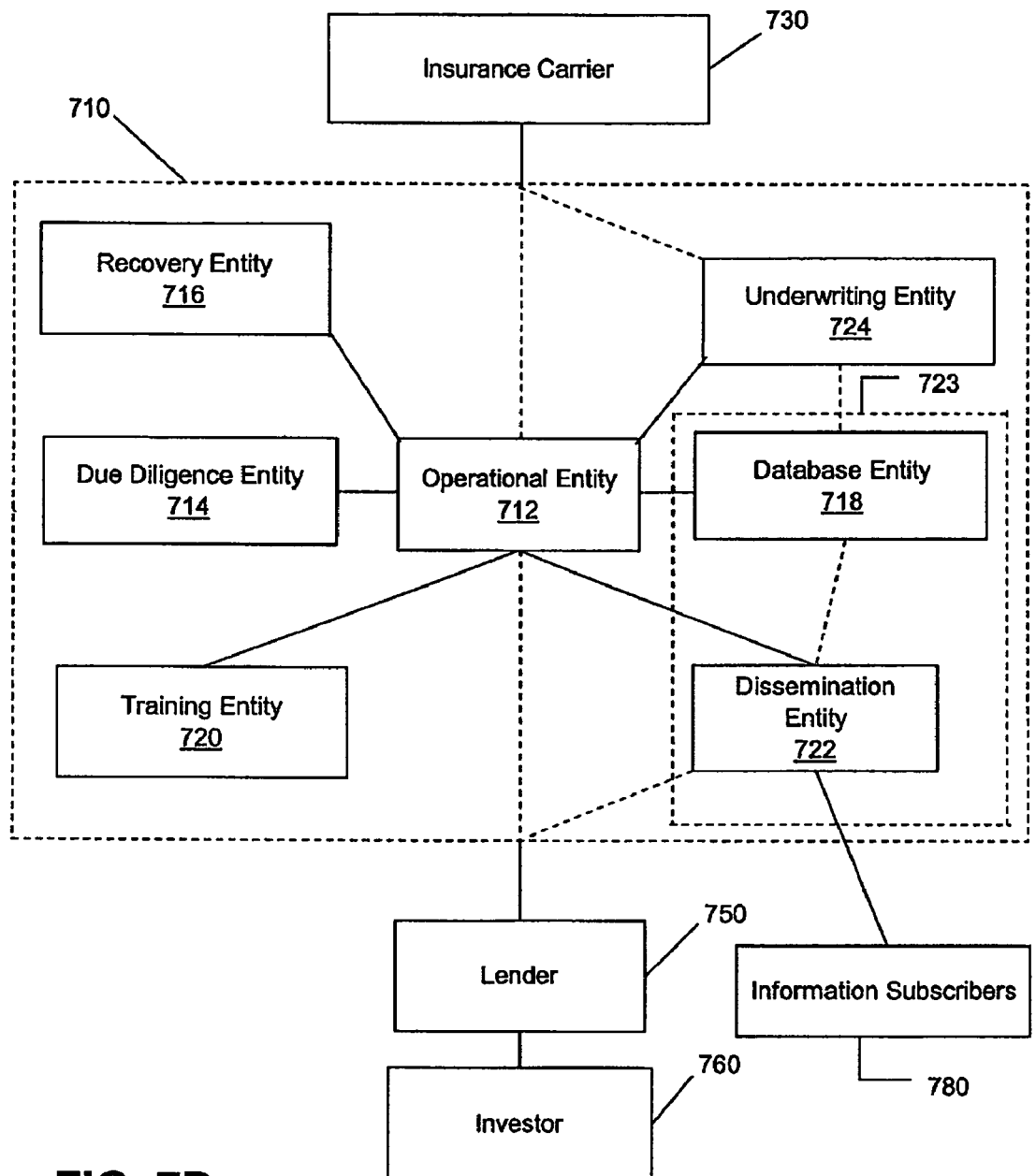

The database entity 718 illustrated in, for example, FIG. 7A has a business relationship with the operational entity 712 for delivery of information contained in a database(s). Examples of information contained in the database(s) include loan information (the loan database) and a list of ineligible entities that are not to be involved in the mortgage process (the ineligible database). The database entity 718 has business relationships with the other insurance enterprise entities to provide access to the information in exchange for information to update the information maintained by the database entity 718. In at least one embodiment, the database entity 718 has a business relationship with the dissemination entity for providing access to outside entities such as lenders 750 or possibly other information subscribers 780 for database searching as illustrated in FIG. 7D. In at one embodiment, the database entity 718 is eliminated from the insurance enterprise 710. In at least one embodiment, the database entity 718 is part of the due diligence entity 714.

The training entity 720 illustrated in, for example, FIG. 7A has a business relationship with the operational entity 712 for delivery of training relating to controls and procedures regarding the mortgage process to the operational entity 712 for delivery to at least one lender 750. The training and suggested controls are refined based upon input from at least one of the operational entity 712, the due diligence 714, the recovery entity 716, and the underwriting entity 724 based upon those entities analysis including, for example, trend analysis of claims, insurance applications, loan files, and industry information. In at least one embodiment, the training entity 720 is eliminated from the insurance enterprise 710 (not shown).

The dissemination entity 722 illustrated in, for example, FIG. 7D has a business relationship with the database entity 718 for delivery of database access to at least one lender 750 or other information subscriber 780. In at least one embodiment, the dissemination entity 722 is eliminated from the insurance enterprise 710. In at least one embodiment, the dissemination entity 722 and database entity 718 are combined into one information entity 723.

Figure 8:
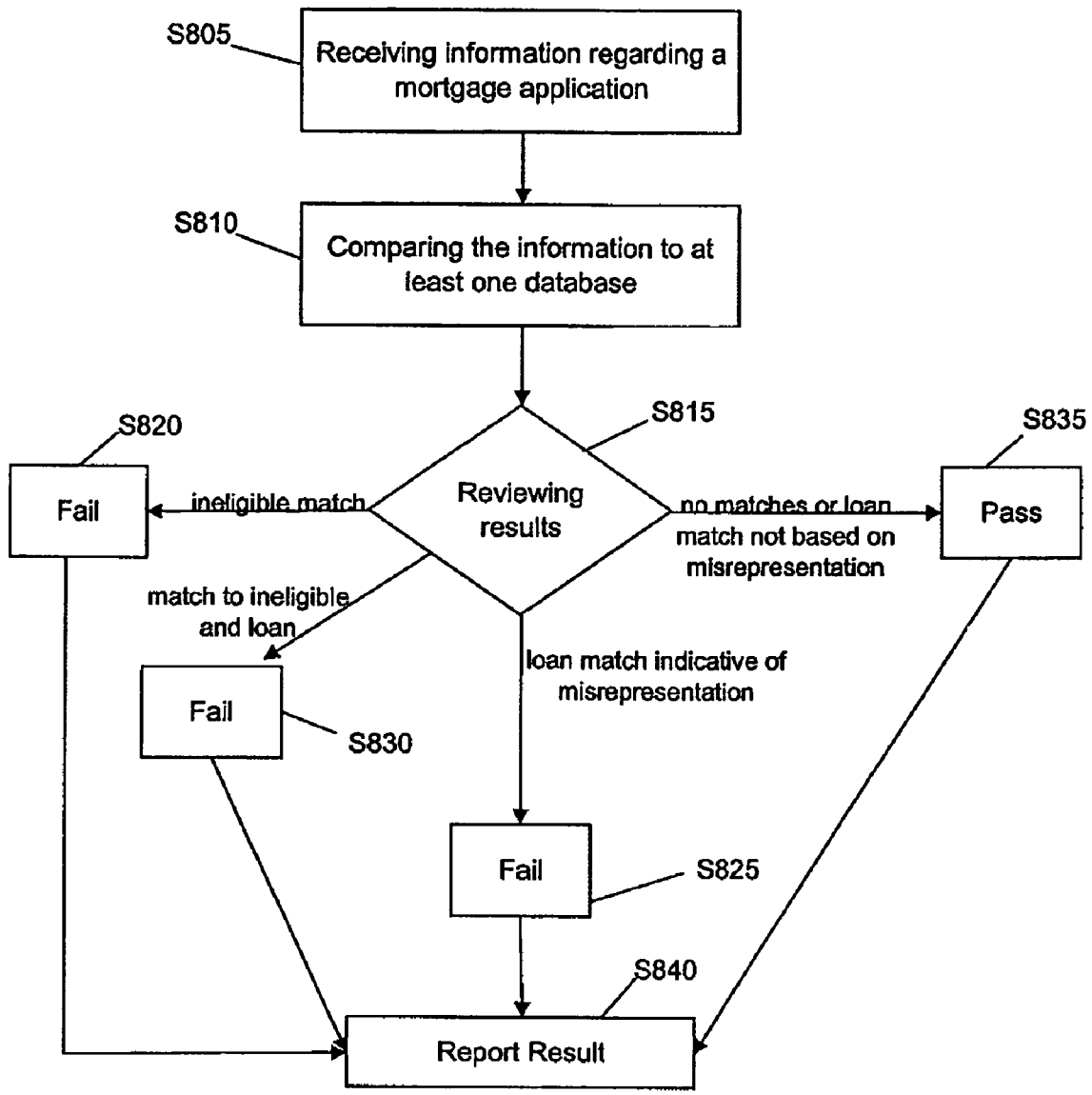
FIG. 8 depicts a flowchart illustrating an exemplary embodiment according to the invention.

In another exemplary embodiment the database entity 718 provides database access to the due diligence entity 714 or some other entity that then provides a service to lenders and correspondents of mortgage application review. The mortgage application review in at least one embodiment results in a pass/fail determination of the mortgage application based on information in the databases. FIG. 8 provides an exemplary method for providing a review service for an entity that receives a mortgage application such as a lender or a correspondent, and depending upon the level of review to be performed by a broker who forwards a mortgage application to a lender, a broker. After the relationship is established between the reviewing entity and the application receiver, information about at least one mortgage application is received the reviewing entity for processing, S805. The information in at least one embodiment includes identification of the proposed borrower, the property address and price, and at least one participating entity in the mortgage procurement and closing process such as the appraiser, closing agent, settlement agent, or seller. This information is then compared to at least one database, S810. Examples of the database include one of the above ineligible databases and the loan database. The information during the comparison is scrubbed against the information in the database(s) for any matches similar, for example, to the scrubbing discussed above for lenders in the insurance program. A review is done of the results from the comparison, S815, to see 1) if there was a match to the ineligible database (or list) resulting in the mortgage application receiving a fail, S820; 2) if there was a match to the loan database and looking at the reason for the match to determine if it is likely a result of a misrepresentation resulting in the mortgage application receiving a fail, S825; 3) both a match to the ineligible database and a match to the loan database resulting in the mortgage application receiving a fail, S830; or 4) no match or the match to the loan database was not the result of a misrepresentation resulting in the mortgage application receiving a pass, S835. If only one database is compared to in S810, then the review that occurs S815 is suitably adjusted based on this disclosure. The result then is reported to the application receiver, S840. In at least one embodiment, the reason for the result is provided to the application receiver.

Another exemplary embodiment of the invention is illustrated in FIG. 9 and relates to the pooling (or aggregation) of mortgages that typically come from multiple lenders. Typically, when mortgages are pooled together it is for the purpose of selling securities tied to the mortgage pool to investors. The aggregating entity receives most of its profit up front when it sells the mortgage pool to another investor(s) or a trust that in turn will sell the securities; however, some mortgages in the pool typically are not included in the price for the total mortgage pool and are held in reserve to address any repurchase requests or losses for the mortgages in the pool that were sold. If the mortgages in the pool reach a certain age, then the aggregating entity receives value for the mortgages held in reserve.

Since the mortgages are aggregated from a variety of lenders, it is difficult for an investor(s) to determine the overall risk of the pool or even predict with any certainty as to which mortgages will be subject to a repurchase request without performing costly due diligence. If the aggregating entity is able to participate in the insurance program, then the insurance coverage can be used as a substitute for all or some of the mortgages that would be used to provide the reserve. This leads to an increased profit for the aggregating entity and also a higher rating for the mortgage pool due to the lower risk for the investor. The higher rating will lead to a higher price for the mortgage pool.

FIG. 9 illustrates the application process for obtaining representation and warranty insurance policy coverage for a mortgage pool by an aggregating entity. The insurance entity begins the process by receiving an insurance application from the aggregating entity for coverage of a pool of mortgages, S905. Although based on this disclosure, it will be appreciated that this step may be preceded by a request for an insurance application from the aggregating entity and sending the insurance application to the requesting aggregating entity. The insurance application preferably includes information regarding the aggregating entity similar to what would be obtained from a lender in the exemplary method shown in FIG. 1 and discussed above. The insurance application also preferably includes information regarding the individual mortgages in the pool, the lenders who originated the mortgages, and any other information that would be of assistance in performing due diligence on the mortgage pool. Identification of the lenders allows the insurance entity to check its own records for additional information on the lender including any prior risk assessment or risk classification. Examples of additional information include whether any of the mortgages are covered by insurance already and the percentage breakdown between the lenders in terms of the number of mortgages and dollar value of the mortgages. If there are mortgages in the mortgage pool already covered by insurance from the insurance program, then, for example, the pricing may be reduced to take into account the previously paid for coverage. The insurance entity's database(s) preferably are used to augment the information received from the aggregating entity.

After receiving the insurance application, a risk assessment is performed, S910, similar to the risk assessment described above for a lender including requesting any clarification and/or additional information. The risk assessment preferably takes a look at the individual lenders in terms of the historical track record, the experience level, and the level of controls for the types of mortgages sold by that lender into the mortgage pool. A review of prior lender risk assessments is done to determine whether one exists, and if one exists updating it. A risk assessment also is made of the aggregating entity, preferably including the historical track, the experience level, and the level of controls used. Depending upon the risk assessment, a determination is made whether the mortgage pool is insurable, S915. If the mortgage pool is not insurable, then the aggregating entity is informed of the denial of coverage, S920.

If the mortgage pool is insurable, then a determination of a risk classification is made based on the risk assessment, S925. The factors used in the risk classification for an individual lender apply to a mortgage pool. The risk classification will dictate the premium or pricing to charge the aggregating entity for the mortgage pool, S930. An insurance agreement is offered to the aggregating entity that includes the premium that will be charged and the conditions on which the insurance agreement is offered, S935. If the aggregating entity accepts the insurance agreement, then receiving the executed insurance agreement and the premium for the insurance coverage from the aggregating entity, S940. Then typically, an insurance policy is issued to the aggregating entity, S945. If there is a repurchase request made on one of the mortgages in the mortgage pool, then handling the repurchase request, S950, for example, as described above in connection with FIG. 3.

As will be appreciated by one of ordinary skill in the art, the present invention may be embodied as a computer implemented method, a programmed computer, a data processing system, a signal, and/or computer program. Accordingly, the present invention may take the form of an entirely hardware embodiment, an entirely software embodiment or an embodiment combining software and hardware aspects. Furthermore, the present invention may take the form of a computer program on a computer-usable storage medium having computer-usable program code embodied in the medium. Any suitable computer readable medium may be utilized including hard disks, CD-ROMs, optical storage devices, or other storage devices.

Computer program code for carrying out operations of the present invention may be written in a variety of languages. However, consistent with the invention, the computer program code for carrying out operations of the present invention may also be written in other conventional procedural programming languages.

The program code may execute entirely on a mobile computing device, as a stand-alone software package, or it may execute partly on a system user's computing device and partly on a remote computer. In the latter scenario, the remote computer may be connected directly to the system user's computing device via a LAN or a WAN (Intranet), or the connection may be made indirectly through an external computer (for example, through the Internet, a secure network, a sneaker net, or some combination of these). System users include, for example, individuals participating in the performance of the method and third parties like information customers such as lenders, investors, and insurance carriers and/or their agents that are using the system.

The present invention as described above with reference to flowchart illustrations of methods, apparatus (systems) and computer programs in accordance with several embodiments of the invention. It will be understood that each block of the flowchart illustrations, and combinations of blocks in the flowchart illustrations and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means or program code that implements the function specified in the flowchart block or blocks.

The computer program instructions may also be loaded, e.g., transmitted via a carrier wave, to a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Various templates and the database(s) according to the present invention may be stored locally on a provider's stand-alone computer terminal (or mobile computing device), such as a desktop computer, laptop computer, palmtop computer, or personal digital assistant (PDA) or the like. Exemplary stand-alone computers may include, but are not limited to, Apple®, Sun Microsystems®, Linux-compatible computers, or Windows®-compatible computers. Accordingly, the present invention may be carried out via a single computer system, such as a desktop computer or laptop computer.

According to at least one exemplary embodiment, the database(s) may be centrally stored within one or more computers accessible to multiple system users. Accordingly, system users may access the database(s) through a private or public computer network in a conventional manner via wired or wireless communications. By maintaining the database(s) in a central location, updates can be easily made to the database by a system administrator without having to access all of the machines in the network.

As is known to those with skill in this art, network environments may include public networks, such as the Internet, and private networks often referred to as "Intranets" and "Extranets." The term "Internet" shall incorporate the terms "Intranet" and "Extranet" and any references to accessing the Internet shall be understood to mean accessing an Intranet and/or an Extranet, as well unless otherwise noted. The term "computer network" shall incorporate publicly accessible computer networks and private computer networks.

The exemplary and alternative embodiments described above may be combined in a variety of ways with each other. Furthermore, the steps and number of the various steps illustrated in the Figures may be adjusted from that shown.

The present invention as described more fully above with reference to the accompanying drawings, in which preferred and exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The accompanying drawings show exemplary embodiments of the invention.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

I claim:

1. A method for determining an insurance premium for a group of loans for a particular time period handled by a lender covered by an insurance policy, the method using at least one computer comprising:

receiving production information for the group of loans for the particular time period from the lender using the at least one computer, analyzing production information using the at least one computer, setting a premium using the at least one computer for each covered loan in the group of loans based on pricing from the insurance policy and analysis of the production information, notifying the lender of the premiums for the group of loans, and collecting the premiums from the lender.

2. The method according to claim 1, wherein analyzing includes creating at least one profile using the at least one computer for each set of received production information, comparing using the at least one computer the profile for the particular time period against an original profile to determine closeness, tracking divergences using the at least one computer between a series of profiles each from respective particular time periods and the original profile, and adjusting using the at least one computer a premium modifier used in setting the premium for the lender based on divergences.

3. The method according to claim 1, wherein analyzing includes scrubbing the received production information against exclusionary lists for matches using the at least one computer, when a match occurs for a particular loan, excluding the particular loan from insurance coverage and setting of the premium to be paid.

4. The method according to claim 1, wherein analyzing includes scrubbing the received production information against exclusionary lists for matches using the at least one computer, when a match occurs for a particular loan, performing the following notifying the lender that a match occurred for the particular loan, and excluding from coverage the reason for the match.

5. The method according to claim 1, wherein analyzing includes scrubbing the received production information against exclusionary lists for matches using the at least one computer, when a match occurs for a particular loan, performing the following notifying the lender that a match occurred for the particular loan, investigating whether the lender used controls required by the insurance policy, and when controls were not used, excluding from coverage the reason for the match.

6. The method according to claim 1, wherein analyzing includes scrubbing the received production information against exclusionary lists for matches using the at least one computer, when a match occurs for a particular loan, performing the following notifying the lender that a match occurred for the particular loan, and excluding from coverage the particular loan.

7. The method according to claim 1, wherein analyzing includes scrubbing the received production information against exclusionary lists for matches using the at least one computer, when a match occurs for a particular loan, performing the following notifying the lender that a match occurred for the particular loan, and investigating whether the lender used controls required by the insurance policy.

8. The method according to claim 1, further comprising making available to lenders databases containing at least one ineligible list and loan data.

9. The method according to claim 1, wherein analyzing includes scrubbing the received production information against a loan database for matches using the at least one computer, when a match occurs for a particular loan, excluding the particular loan from insurance coverage and setting of the premium to be paid.

10. The method according to claim 1, wherein analyzing includes scrubbing the received production information against a loan database for matches using the at least one computer, when a match occurs for a particular loan, performing the following notifying the lender that a match occurred for the particular loan, and excluding from coverage the reason for the match.

11. The method according to claim 10, further comprising making available to lenders at least one database containing at least one of an exclusionary list and loan data.

12. The method according to claim 10, further comprising receiving using the at least one computer identification of which loan segments of the group of loans for which the lender is requesting coverage under the insurance policy.

13. The method according to claim 1, wherein analyzing includes scrubbing the received production information against a loan database for matches using the at least one computer, when a match occurs for a particular loan, performing the following notifying the lender that a match occurred for the particular loan, and investigating whether the lender used controls required by the insurance policy.

14. The method according to claim 1, wherein analyzing includes scrubbing the received production information against a loan database for matches using the at least one computer, when a match occurs for a particular loan, performing the following notifying the lender that a match occurred for the particular loan, and excluding from coverage the particular loan.

15. The method according to claim 1, further comprising issuing a certificate for each loan covered by the insurance policy and for which a premium was paid for by the lender.

16. The method according to claim 1, wherein the particular time period is a period of time prior to issuance of the insurance policy.

17. The method according to claim 1, wherein when the total of the premiums for the particular time period is below a minimum premium total from the insurance policy, the premiums collected from the lender for the particular time period are equal to the minimum premium total.

18. The method according to claim 1, further comprising receiving using the at least one computer identification of which loan segments of the group of loans for which the lender is requesting coverage under the insurance policy.

19. The method according to claim 1, wherein production information includes for each loan in the group of loans identification of at least two parties involved with the loan, an amount of the loan, a value of a property securing the loan, property identification information, and loan identification information.

20. A method for determining an insurance premium for a group of loans for a particular time period handled by a lender covered by an insurance policy, the method using at least one computer comprising:
receiving using the at least one computer production information for the group of loans for the particular time period from the lender,
receiving using the at least one computer a designation of which loans within the group of loans the lender wants covered under the insurance policy,
analyzing production information using the at least one computer,
setting a premium for each covered loan in the group of loans based on pricing from the insurance policy and analysis of production information using the at least one computer,
notifying the lender of the premiums for the group of loans, and
collecting the premiums from the lender.

21. The method according to claim 20, wherein the designation of which loans is a designation of at least one loan category.

22. The method according to claim 21, wherein analyzing includes
scrubbing the received production information against exclusionary lists for matches using the at least one computer,
when a match occurs for a particular loan, performing the following
notifying the lender that a match occurred for the particular loan, and
excluding from coverage at least the reason for the match.

23. The method according to claim 22, wherein analyzing includes
scrubbing the received production information against a loan database for matches using the at least one computer,
when a match occurs for a particular loan, performing the following
notifying the lender that a match occurred for the particular loan, and
excluding from coverage at least the reason for the match.

24. The method according to claim 20, further comprising scrubbing the received production information against the at least one database for matches using the at least one computer, when a match occurs for a particular loan, performing the following
notifying the lender that a match occurred for the particular loan, and
excluding from coverage at least the reason for the match.

25. The method according to claim 20, wherein analyzing includes
scrubbing the received production information against a loan database for matches using the at least one computer,
when a match occurs for a particular loan, performing the following
notifying the lender that a match occurred for the particular loan, and
excluding from coverage at least the reason for the match.

* * * * *